United States Patent
Shah et al.

(10) Patent No.: US 10,261,165 B2
(45) Date of Patent: *Apr. 16, 2019

(54) DETERMINING NETWORK SYNCHRONIZATION STATUS

(71) Applicant: QUALCOMM Incorporated, San Diego, CA (US)

(72) Inventors: Mayur Shah, Millcreek, WA (US); Guttorm Opshaug, Redwood City, CA (US); Rayman Pon, Cupertino, CA (US); Grant Marshall, Campbell, CA (US); Dominic Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,811

(22) Filed: Sep. 25, 2015

(65) Prior Publication Data
US 2016/0187458 A1    Jun. 30, 2016

Related U.S. Application Data

(60) Provisional application No. 62/099,085, filed on Dec. 31, 2014.

(51) Int. Cl.
*H04W 56/00* (2009.01)
*G01S 5/02* (2010.01)
*H04W 4/02* (2018.01)
*H04W 64/00* (2009.01)

(52) U.S. Cl.
CPC ............. *G01S 5/021* (2013.01); *G01S 5/02* (2013.01); *G01S 5/0252* (2013.01); *H04W 4/02* (2013.01); *H04W 56/00* (2013.01); *H04W 56/001* (2013.01); *H04W 64/00* (2013.01)

(58) Field of Classification Search
CPC ............. H04W 48/16; H04W 52/0229; H04W 84/045; H04W 4/00; H04W 84/04; H04W 52/02
USPC .......................................... 455/456.1, 456.2
See application file for complete search history.

(56) References Cited

U.S. PATENT DOCUMENTS

| | | |
|---|---|---|
| 6,782,274 B1 | 8/2004 | Park et al. |
| 6,845,239 B1 | 1/2005 | Sato et al. |
| 6,952,583 B1 | 10/2005 | Park et al. |

(Continued)

FOREIGN PATENT DOCUMENTS

| | | |
|---|---|---|
| EP | 2574123 A2 | 3/2013 |
| WO | 2014124106 A1 | 8/2014 |

OTHER PUBLICATIONS

International Search Report and Written Opinion—PCT/US2015/066180—ISA/EPO—dated Apr. 26, 2016.

*Primary Examiner* — Julio R Perez
(74) *Attorney, Agent, or Firm* — Thien T. Nguyen

(57) ABSTRACT

Methods, systems, computer-readable media, and apparatuses for determining a position of a mobile device connected to a network are presented. In various embodiments, the mobile device obtains a synchronization status of the network associated with one or more base stations. If the synchronization status indicates that the network is synchronous, the mobile device determines the position of the mobile device using previously collected crowdsourced time correction data for the synchronous network.

30 Claims, 16 Drawing Sheets

(56) References Cited

U.S. PATENT DOCUMENTS

| | | |
|---|---|---|
| 7,917,156 B2 * | 3/2011 | Sheynblat ............... G01S 1/026 455/456.1 |
| 9,313,720 B2 * | 4/2016 | Balasubramanian ........................ H04W 48/16 |
| 2003/0119496 A1 | 6/2003 | Gaal et al. |
| 2003/0125045 A1 | 7/2003 | Riley et al. |
| 2005/0043046 A1 | 2/2005 | Lee |
| 2007/0280160 A1 | 12/2007 | Kim et al. |
| 2008/0278373 A1 | 11/2008 | Monnerat |
| 2009/0137250 A1 | 5/2009 | Kurimoto et al. |
| 2009/0191866 A1 * | 7/2009 | Flore .................... H04W 8/005 455/434 |
| 2010/0317343 A1 | 12/2010 | Krishnamurthy et al. |
| 2010/0331009 A1 | 12/2010 | Krishnamurthy et al. |
| 2010/0331013 A1 | 12/2010 | Zhang |
| 2011/0039583 A1 | 2/2011 | Frank et al. |
| 2011/0105144 A1 | 5/2011 | Siomina et al. |
| 2011/0176440 A1 | 7/2011 | Frank et al. |
| 2011/0205914 A1 | 8/2011 | Krishnamurthy et al. |
| 2011/0285591 A1 * | 11/2011 | Wong .................... G01S 5/0036 342/451 |
| 2011/0286349 A1 * | 11/2011 | Tee ....................... H04W 64/00 370/252 |
| 2012/0039284 A1 | 2/2012 | Barbieri et al. |
| 2012/0083278 A1 | 4/2012 | Kazmi et al. |
| 2012/0190373 A1 | 7/2012 | Tenny |
| 2012/0208566 A1 | 8/2012 | Siomina et al. |
| 2012/0252487 A1 | 10/2012 | Siomina et al. |
| 2012/0306691 A1 | 12/2012 | Werner |
| 2012/0306692 A1 | 12/2012 | Werner |
| 2012/0307670 A1 | 12/2012 | Kazmi et al. |
| 2013/0045759 A1 | 2/2013 | Smith |
| 2013/0107802 A1 | 5/2013 | Lee et al. |
| 2013/0235864 A1 | 9/2013 | Do et al. |
| 2013/0288692 A1 | 10/2013 | Dupray et al. |
| 2013/0321210 A1 | 12/2013 | Werner et al. |
| 2014/0171097 A1 | 6/2014 | Fischer et al. |
| 2014/0176366 A1 | 6/2014 | Fischer et al. |
| 2014/0233624 A1 * | 8/2014 | Pon ..................... H04L 43/0864 375/226 |
| 2014/0274113 A1 * | 9/2014 | Teed-Gillen .......... H04W 64/00 455/456.1 |
| 2016/0044591 A1 | 2/2016 | Pao et al. |
| 2016/0066151 A1 | 3/2016 | Palanki et al. |
| 2016/0187455 A1 | 6/2016 | Shah et al. |
| 2017/0160374 A1 | 6/2017 | Wirola et al. |

* cited by examiner

DETERMINING NETWORK SYNCHRONIZATION STATUS

CROSS-REFERENCES TO RELATED APPLICATIONS

This patent application claims priority to U.S. Provisional Patent Application Ser. No. 62/099,085, filed Dec. 31, 2014, entitled "Determining Network Synchronization Status," the content of which is incorporated herein by reference in its entirety for all purposes.

BACKGROUND

Aspects of the disclosure relate to determining a timing characteristic associated with a network.

The quality of mobile device positioning using base stations may be dependent on the level of synchronization between the base stations. If a base station is associated with a synchronous network, a clock bias of the base station will typically remain relatively constant with respect to a reference time. If a base station is not synchronous with other base stations in its vicinity, signals from the base station may be of limited value for positioning.

BRIEF SUMMARY

Certain aspects of the disclosure relates to determining whether a network is a synchronous network.

In one example, a method for determining a position of a mobile device connected to a network is described. The mobile device obtains a synchronization status of the network associated with one or more base stations. If the synchronization status indicates that the network is synchronous, the mobile device determines the position of the mobile device using previously collected crowdsourced time correction data for the network.

In another example, a mobile device for determining a position of the mobile device associated with a network is described. The mobile device includes a processor, a computer readable storage device coupled to the processor, and one or more programs. The one or more programs are stored in the computer readable storage device and are configured to be executed by the processor. The one or more programs include instructions for obtaining a synchronization status of the network associated with one or more base stations. If the synchronization status indicates that the network is synchronous, the one or more programs include instructions for determining the position of the mobile device using previously collected crowdsourced time correction data for the network.

In another example, a non-transitory computer readable storage medium is described. The non-transitory computer readable storage medium includes machine-readable instructions for determining a position of a mobile device associated with a network. The instructions, when executed by one or more processors, cause the one or more processors to obtain a synchronization status of the network associated with one or more base stations. The instructions can also include instructions for the one or more processors to determine the position of the mobile device using previously collected crowdsourced time correction data for the network if the synchronization status indicates that the network is synchronous.

In an additional example, an apparatus is described. The apparatus includes means for obtaining a synchronization status of a network associated with one or more base stations, and means for determining a position of the apparatus using previously collected crowdsourced time correction data for the network if the synchronization status indicates that the network is synchronous.

In one example, a method for crowdsourcing synchronization status of a network is described. A server receives a synchronization status of a base station associated with the network, and collects information for computing time correction data if the synchronization status indicates that the network is synchronous.

In another example, a server is described. The server includes a processor, a computer readable storage device coupled to the processor. The computer readable storage device stores one or more programs executable by the processor. The one or more programs include instructions for receiving a synchronization status of a base station associated with a network, and collecting information for computing time correction data if the synchronization status indicates that the network is synchronous.

In an additional example, a non-transitory computer readable storage medium is described. The non-transitory computer readable storage medium includes machine-readable instructions for crowdsourcing synchronization status of a network. The instructions, when executed by one or more processors, cause the one or more processors to receive a synchronization status of a base station associated with the network, and collect information for computing time correction data if the synchronization status indicates that the network is synchronous.

In a further example, an apparatus is described. The apparatus includes means for receiving a synchronization status of a base station associated with a network, and means for collecting information for computing time correction data if the synchronization status indicates that the network is synchronous.

BRIEF DESCRIPTION OF THE DRAWINGS

Aspects of the disclosure are illustrated by way of example.

DETAILED DESCRIPTION

Figure 1A:
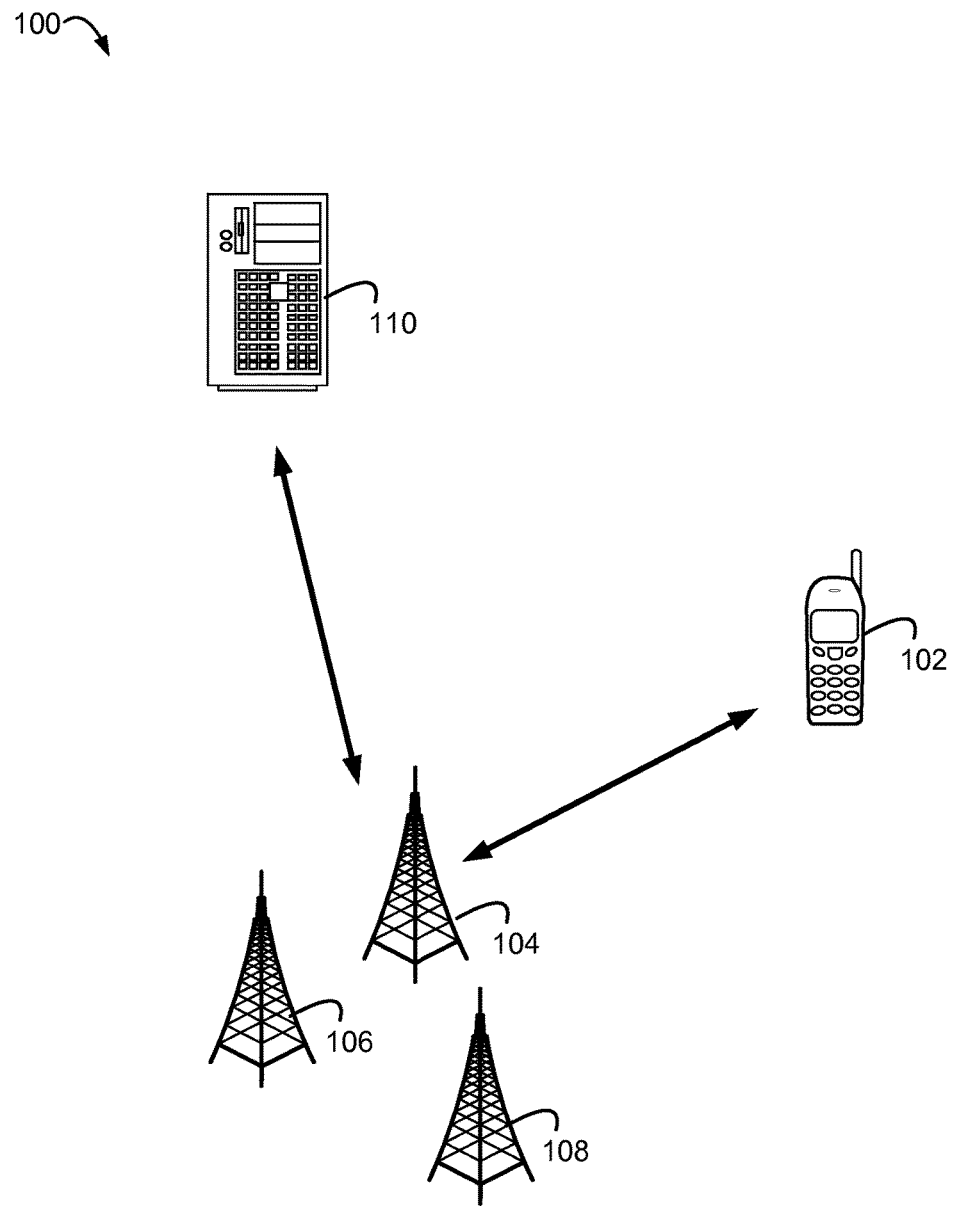
FIG. 1A illustrates a terrestrial network system that may be implemented for determining a position of a mobile device, according to some embodiments.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

For various approaches to mobile device positioning using base stations, positioning accuracy may be improved when the base stations are synchronized with one another. Mobile device positioning may use locations of base stations and clock biases of base stations as determined by a mobile device to trilaterate a position of a mobile device relative to the base stations. When a mobile device receives information from a base station that is not synchronized with other base stations, the information may not be usable to provide mobile device positioning with a desired level of accuracy. For example, observed time difference of arrival (OTDOA) positioning may require base stations to be time-synchronized to a particular degree of accuracy that is greater than the accuracy required for communication purposes.

Typically, a base station that is a component of a synchronous network is synchronized with other base stations in the network. In some cases, a base station that is part of a synchronous network may not be synchronized with other base stations in the network, for example, when a base station is a small cell (for example, a femtocell). When base stations are part of an asynchronous network, a base station in the network may not be synchronized with one or more other base stations in the network.

A base station may be synchronous with another base station when the base station uses a clock signal that is synchronous with respect to another clock signal, such as clock signal of another base station or a reference clock signal from another source. Various approaches are discussed below for determining whether base stations of a network are synchronous with respect to one another.

As used herein, "synchronous" is used to describe a network in which a clock signal of at least one network component is in phase with a reference clock signal. Additionally or alternatively, "synchronous" may describe a network in which a network component uses a clock signal that is in phase with a clock signal of one or more other network components (for example, a self-synchronous network). "In phase" indicates that clock signals have limited phase variation with respect to one another, for example, over a reference period of time. For example, a pair of network components may be "in phase" when start times of frames from the pair network components fall within a maximum allowable deviation. A pair of network components may also be "in phase" when a change of the start time of frames from one network component with respect to the start time of frames from the other network component falls within a maximum allowable deviation.

An example of a synchronous network may be a terrestrial network, such as a cellular telecommunications network. Network components of a cellular telecommunications network may include one or more base stations. An example of a synchronous cellular telecommunications network is a synchronous code division multiple access (CDMA) network, such as CDMA2000. Other examples of a radio access technology that is synchronous are also possible.

Time synchronization requirements for a synchronous network may be limited to a standardized range, for example a range of about ±1 μs to about ±100 μs from a reference time, such as about ±1.5 μs to about ±5 μs from a reference time, for example, about 3 μs from a reference time. The standardized range may be expressed as a maximum absolute deviation in frame start timing between a pair of network components, for example, cells on the same frequency that have overlapping coverage areas.

As used herein, a "frame" may be a predefined structure for data transmission arrangement and/or timing in LTE. For example, a frame may have a length of a reference period of time, such as 10 ms. The frame may be divided in to a predefined number of slots, such as 20 slots. The frame may also be divided into a predefined number of subframes, such as ten subframes. For example, a subframe may comprise two slots. It will be recognized that other frame durations, subframe definitions, and slot definitions could be used for various frame types.

A reference time may be, for example, CDMA time, coordinated universal time (UTC), or another reference time. In some embodiments, a reference time may be provided by a positioning network such as a global navigation satellite system (GNSS), for example, a global positioning system (GPS) or global navigation satellite system (GLONASS). To synchronize base stations of a terrestrial network, GPS timing receivers may be located at one or more base stations of the network.

As used herein, "mobile device" may refer to any mobile electronic computing device. The mobile device may be capable of receiving signals from components of a terrestrial network. Examples of mobile devices may include smartphones, laptop computers, portable gaming systems, specialized electronic devices for positioning, or any other such electronic device. Additional examples of mobile devices and computing devices may be as disclosed in FIGS. 8-9 below.

As used herein, "base station" refers to a base transceiver station (BTS) capable of transmitting and receiving radio signals. The BTS may communicate with a base station controller and with one or more mobile devices.

As used herein, "positioning information" refers to any data transmitted from a mobile device for use in mobile device positioning. For example, positioning information may include data pertaining to time of arrival of positioning reference signals received from base stations of one or more cells, identifying information associated with one or more base stations, other information associated with base stations, identifying information associated with a mobile device, other information associated with mobile devices, etc. Positioning information can include an indication of whether a base station is synchronous and/or whether a network associated with a base station is synchronous. Positioning information may be transmitted from a mobile device to a server, for example, via a base station. Positioning information may be transmitted form a mobile device to another mobile device.

The synchronization status of a network can be useful information to enable a mobile device to use signals received from base stations of the network in determining its position, or providing measurements of those signals to a server for the server to determine the position of the mobile device. Such positioning can provide a less power-hungry method of determining the mobile device's position relative to other methods, such as GPS or other non-terrestrial methods. Positioning methods that are based on the timing of signals transmitted by base stations and received by mobile stations can be sensitive to biases or differences between the times of actual transmission and/or reception of certain signals and the indicated times of transmission and/or reception of those signals. The indicated times may be indicated through time stamps and other data related to the transmitted or received data that is based on a reference clock of a base station. Differences between the times of actual transmission and/or reception of signals and the indicated times of transmission and/or reception of signals can be provided to a mobile device or a server using time correction data, for example a forward link calibration (FLC). In an asynchronous network, for example wideband CDMA (WCDMA), such time correction data can remain valid for a few seconds to a minute or two minutes, for example ten seconds. However, for synchronous networks, such time correction data can remain valid for hours or days, or, in principle, indefinitely. Such time correction data can be included in assistance data provided to a mobile device, or to a server, for determining the location of a mobile device based on measurements made by the mobile device. Hence, if a mobile device can obtain a determination that a network is a synchronous network, for example by making such a determination itself or by receiving an indication that the network is synchronous from a server, a position determination can be made for the mobile device using previously collected crowdsourced assistance data including the time correction data. For example, in implementations where the mobile device is to determine its own position, the mobile device can, in response to determining that the network is a synchronous network, or otherwise obtaining information indicating that the network is a synchronous network, use data from a plurality of base stations, for example two or more base stations, or three or more base stations, within the synchronous network to determine the position of the mobile device based on previously collected crowdsourced assistance data for the synchronous network. Previously collected can indicate, for example, that the assistance data was not currently crowdsourced within the past few seconds or minutes. Alternatively, previously collected can indicate that the assistance data was collected one or more hours ago.

A server can determine time correction data by receiving data from a plurality of mobile devices. For example, mobile devices that have access to GPS can determine, using GPS, their current locations. If they make timing measurements of signals from base stations within a synchronous network and send such measurements to the server, the server can determine the time correction data, such as an FLC, based on the mobile device's reported GPS-based location and based on the known locations of the base station antennas for a given base station. The server can also use such timing measurements along with the mobile device's reported GPS-based location to determine or estimate the location of the base station antenna, hence prior knowledge of the base station antenna locations is not essential. The server can crowdsource such data from a large number of mobile devices. Hence, a determination of the synchronization status of a network can help determine how frequently to update time correction data so that time-based signal measurements can accurately be used for mobile device positioning. This can allow a mobile device, or a server, to determine a position for the mobile device without the use of GPS or other non-terrestrial positioning methods.

Embodiments described herein relate to a timing characteristic of a network and may be implemented for determining a synchronization status of a network associated with base stations in a terrestrial network system, described with regard to FIG. 1.

FIG. 1A illustrates one potential implementation of a terrestrial network system (or network) 100 for determining a position of a mobile device, according to some embodiments. Terrestrial network system 100 may include a mobile device 102 and a plurality of base stations, for example, base stations 104, 106, and 108. Terrestrial network system 100 may provide voice and/or data communication for a number of mobile devices including mobile device 102 via base stations 104-108. In some embodiments, terrestrial network system 100 may be an evolved universal mobile telecommunications system (UMTS) Terrestrial Radio Access Network (e-UTRAN).

In some embodiments, terrestrial network system 100 includes a server computer (or "server") 110. Server 110 may comprise one or more computing devices capable of processing location data and communicating with mobile device 102 regarding position data. Server 110 may access data from a database (not shown). The database may be stored on one or more computing devices of server 110, or may be stored on one or more computing devices that are remote from and communicatively coupled to server 110. Server 110 may be located on-site in an area for which position data is being provided, or may be located remotely from such an area.

Terrestrial network system 100 may be used to determine a position for mobile device 102 using signals transmitted from one or more base stations 104-108.

Mobile device 102 may receive and/or observe position data from base stations 104-108. Position data from a base station may include, for example, a location of a base station and a clock bias of the base station. Mobile device 102 may use the position data to perform trilateration or other position analysis techniques to estimate the position of mobile device 102.

Mobile device 102 may transmit position data to server 110. Server 110 may use the information to determine positions of mobile devices such as mobile device 102. For example, server 110 may use the position data to estimate a distance between mobile device 102 and multiple base stations 104-108. Server 110 may use trilateration or other position analysis techniques to determine positions of mobile devices. Server 110 may provide position data indicating the position of mobile device 102 to mobile device 102. For example, server 110 may transmit location coordinates of mobile device 102 to mobile device 102.

In some embodiments, mobile device 102 may receive positioning data from WiFi or other access points, GPS satellites, or other sources of positioning information. Mobile device 102 may transmit the positioning data to server 110 or use the positioning data to determine a position of mobile device 102.

In some embodiments, a crowdsourcing scheme may be used to provide information from base stations 104-108 to mobile devices 102 and/or from mobile devices 102 to server 110. For example, a plurality of mobile devices 102 may participate in crowdsourcing. The participating mobile devices 102 may receive and/or observe position data from base stations 104-108. The participating mobile devices 102 may transmit the position data to other mobile devices 102 and/or to server 110. Server 110 may use the received position data to determine a position of mobile device 102.

Figure 1B:
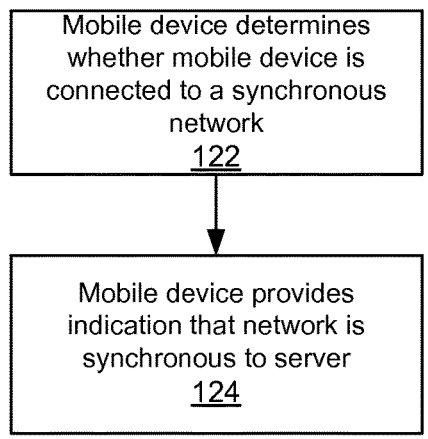
FIG. 1B illustrates example operations of a mobile device for determining a network synchronization status of a network by the mobile device.

FIG. 1B illustrates example operations of a mobile device for determining a network synchronization status of a network by the mobile device. At operation 122, a mobile device, such as mobile device 102, can determine whether network 100 that mobile device 102 connects to is a synchronous network. Mobile device 102 may determine whether network 100 is a synchronous network using various techniques, such as the ones described below with respect to operations 202-206 of FIG. 2A, operations 252-256 of FIG. 2B, operations 302-306 of FIG. 3, operations 402-406 and 410 of FIG. 4, operations 602-610 and 614 of FIG. 6, and operations 782-790 of FIG. 7C. Although these techniques are described with explicit reference to a mobile device, those skilled in the art would understand that these techniques can be used, at least partially, by a server, such as server 110, to determine a network synchronization status of a network.

At operation 124, mobile device 102 may provide an indication that network 100 is a synchronous network to server 110 based on the determination at operation 122. Server 110 may use the information to determine positions of mobile devices, such as mobile device 102. For example, server 110 can determine the position of mobile device 102 at least partially using previously collected crowdsourced assistance data for the synchronous network. Server 110 may also use the information to update a list of synchronous networks or base stations associated with synchronous networks (i.e., a whitelist). Similarly, when mobile device 102 determines that a network is asynchronous, mobile device 102 can provide information indicating that the network is asynchronous to server 110. Server 110 may use the information to update a list of asynchronous networks or base stations associated with asynchronous networks (i.e., a blacklist). In addition to providing an indication to server 110, based on the determination that network 100 is synchronous, mobile device 102 can determine its position at least partially using previously collected crowdsourced assistance data for the synchronous network.

Figure 1C:
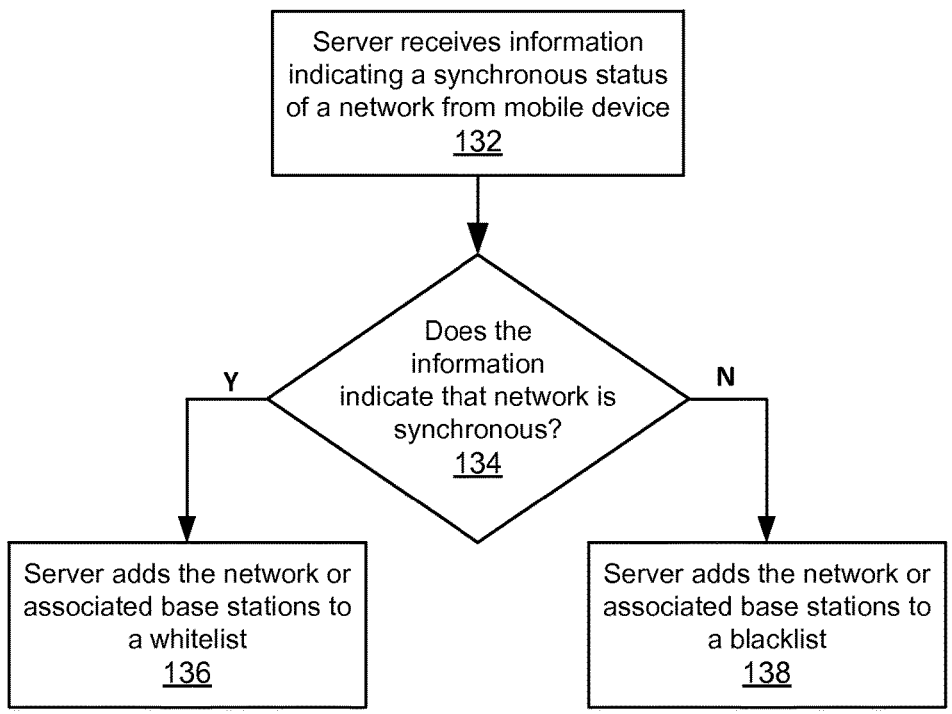
FIG. 1C illustrates example operations of a server for determining a network synchronization status of a network by a mobile device.

FIG. 1C illustrates example operations of a server for determining a network synchronization status of a network by a mobile device. At operation 132, server 110 receives information regarding a synchronization status of a network from a mobile device, such as mobile device 102. The information regarding the synchronization status of the network from a mobile device may be the information provided by mobile device 102 as described above with respect to operation 124 of FIG. 1B.

At operation 134, server 110 may check whether the information received from mobile device 102 indicating that the network is a synchronous network.

At operation 136, if the information received from a mobile device, such as mobile device 102, indicates that the network is a synchronous network, server 110 may add the network or base stations associated with the network to a whitelist. The whitelist may be stored by server 110 and may be a list of base station identifiers indicating base stations associated with synchronous networks or a list of network identifiers indicating synchronous networks. Server 110 may provide a whitelist to mobile device 102. Mobile device 102 may use the whitelist to determine base stations usable for position analysis. Mobile device 102 may use information received from base stations associated with synchronous networks to determine a position of mobile device 102. For example, mobile device 102 can determine its position at least partially using previously collected crowdsourced assistance data for the synchronous networks.

At operation 138, if the information received from a mobile device, such as mobile device 102, indicates that the network is an asynchronous network, server 110 may add the network or base stations associated with the network to a blacklist. The blacklist may be stored by server 110 and may be a list of base station identifiers indicating base stations associated with asynchronous networks or a list of network identifiers indicating asynchronous networks. Server 110 may provide a blacklist to mobile device 102. Mobile device 102 may use the blacklist to determine base stations to avoid using for position analysis.

Figure 1D:
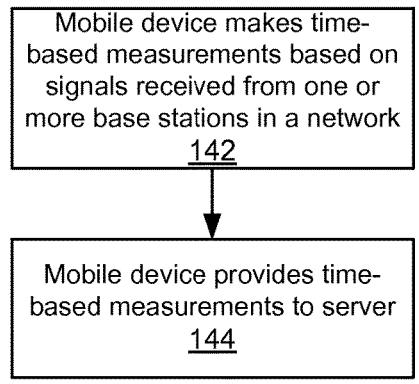
FIG. 1D illustrates example operations of a mobile device for determining a network synchronization status of a network by a server.

FIG. 1D illustrates example operations of a mobile device for determining a network synchronization status of a network by a server. At operation 142, a mobile device, such as mobile device 102, makes time-based measurements based on signals received from one or more base stations in a network. Embodiments of the time-based measurements may include the ones described below with respect to operations 602-608 of FIG. 6, operations 702 and 706 of FIG. 7A, operations 782 and 784 of FIG. 7C, or operations 802 and 806 of FIG. 8.

At operation 144, mobile device 102 may provide the time-based measurements to server 110.

Figure 1E:
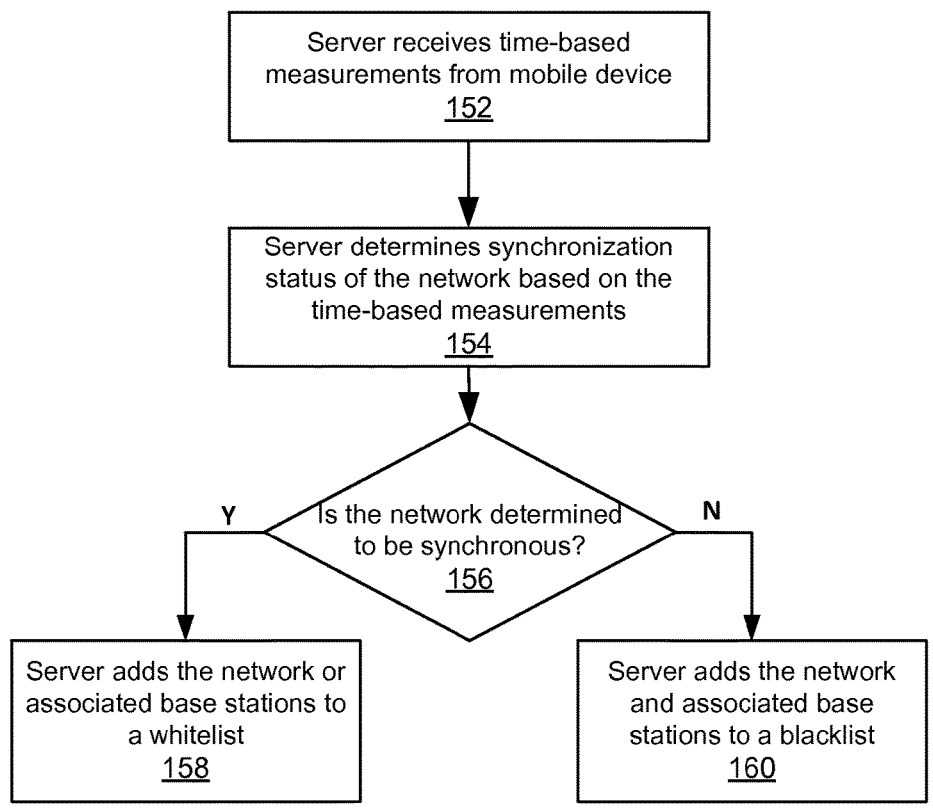
FIG. 1E illustrates example operations of a server for determining a network synchronization status of a network by the server.

FIG. 1E illustrates example operations of a server for determining a network synchronization status of a network by the server. At operation 152, server 110 receives time-based measurements from a mobile device, such as mobile device 102. The time-based measurements may be provided by mobile device 102 as described above with respect to operation 144 of FIG. 1D.

At operation 154, server 110 may determine a synchronization status of the network based on the received time-based measurements using various techniques, such as the ones described below with respect to operation 756 of FIG. 7B, or operation 810 of FIG. 8. Additionally, techniques described and illustrated in implementations where mobile device determines synchronization status may instead be performed by server 110 based on the received time-based measurements, for example techniques described below with respect to operations 602-610 and 614 of FIG. 6 and operations 782-790 of FIG. 7C.

At operation 156, server 110 may check whether the network is determined to be a synchronous network.

At operation 158, if server 110 determines that the network is a synchronous network, server 110 may add the network or base stations associated with the network to a whitelist. The whitelist may be stored by server 110 and may be a list of base station identifiers indicating base stations associated with synchronous networks or a list of network identifiers indicating synchronous networks. Server 110 may provide a whitelist to mobile device 102. Mobile device 102 may use the whitelist to determine base stations usable for position analysis. Mobile device 102 may use information received from base stations associated with synchronous networks to determine a position of mobile device 102. For example, mobile device 102 can determine its position at least partially using previously collected crowdsourced assistance data for the synchronous networks. It is understood that data collected by the server in operations 132 and 152 of FIGS. 1C and 1E, when received by a plurality of mobile devices, can be considered crowdsourced data. Furthermore, server 110 can determine time correction data for base stations based on such data, as well as other data collected by the server.

At operation 160, if server 110 determines that the network is an asynchronous network, server 110 may add the network or base stations associated with the network to a blacklist. The blacklist may be stored by server 110 and may be a list of base station identifiers indicating base stations associated with asynchronous networks or a list of network identifiers indicating asynchronous networks. Server 110 may provide a blacklist to mobile device 102. Mobile device 102 may use the blacklist to determine base stations to avoid using for position analysis.

Figure 1F:
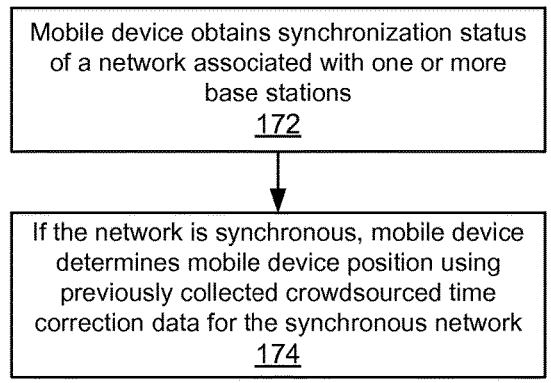
FIG. 1F illustrates example operations of a mobile device for determining a position of the mobile device.

FIG. 1F illustrates example operations of a mobile device for determining a position of the mobile device. At operation 172, the mobile device, such as mobile device 102, obtains a synchronization status of a network, such as network 100, associated with one or more base stations, such as base stations 104-106 of FIG. 1A. The synchronization status of network 100 may be determined by mobile device 102 or received by mobile device 102 from server 110. The synchronization status of network 100 may be determined using system information received by a mobile device from a base station as described below in Section I, using time difference of arrival (TDOA) as described below in Section II, or using two or more clock biases as described below in Section III.

At operation 174, if the synchronization status of network 100 indicates that network 100 is synchronous, mobile device 102 determines the position of mobile device 102 using previously determined or collected crowdsource time correction data for the synchronous network as described above.

Figure 1G:
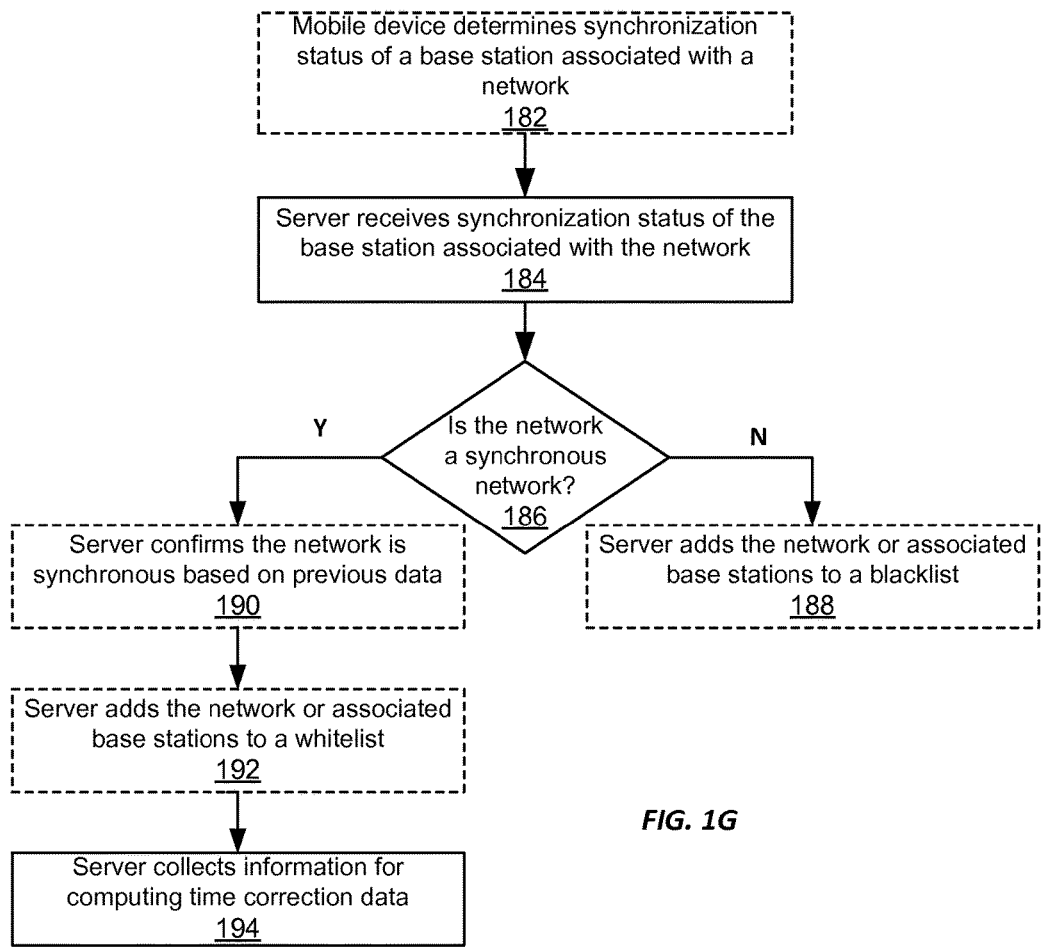
FIG. 1G illustrates example operations of a server receiving a synchronization status of a base station associated with a network.

FIG. 1G illustrates example operations of a server receiving a synchronization status of a base station associated with a network. At operation 182, optionally, a mobile device, such as mobile device 102 of FIG. 1A, determines a synchronization status of a base station associated with a network, such as network 100 of FIG. 1A. Mobile device 102 may determine the synchronization status of a base station associated with network 100 using various techniques as described with respect to FIGS. 1F, 2A, 2B, 3, 4, 6, 7C and 8.

At operation 184, a sever, such as server 110, receives synchronization status of a base station associated with network 110 from mobile device 102.

At operation 186, based on the received synchronization status of the base station associated with network 100, server 110 determines whether network 100 is a synchronous network or an asynchronous network.

At operation 188, if network 100 is determined to be an asynchronous network based on the received synchronization status of network 100, server 110 may add network 100 or its associated base stations to a blacklist as described above. Server 110 may provide the blacklist to mobile device 102. Mobile device 102 may use the blacklist to determine base stations to avoid using for position analysis. It is understood that server 110 may not simply put base station, network, in a black list without confirming synchronization status based on receiving synchronization status from a plurality of mobile devices using statistical methods.

At operation 190, if network 100 is determined to be a synchronous network based on the received synchronization status of network 100, server may optionally confirm that network 100 is a synchronous network based on previous data, such as synchronization status data previously or subsequently received from mobile device 102 or other mobile devices connected to network 100.

At operation 192, server 110 may add network 100 or base stations associated with network 100 to a whitelist as described above. The whitelist may be stored by server 110 and may be a list of base station identifiers indicating base stations associated with synchronous networks or a list of network identifiers indicating synchronous networks. Server 110 may provide the whitelist to mobile device 102. Mobile device 102 may use the whitelist to determine base stations usable for position analysis.

At operation 194, server 110 collects information for computing time correction data, such as a forward link calibration (FLC), from at least one of mobile devices or base stations. The information for computing time correction data may include timing measurement data, such as time of arrival (TOA) of signals from base stations. For example, mobile devices may make timing measurements, such as time difference of arrival, of signals from base stations within a synchronous network and send such measurements to the server, which the server can then use to determine and update time correction data, such as an FLC. Information collected by mobile device 102 that can be used in computing time correction data includes time difference of arrival between a first beacon from a first base station in the synchronous network and a second beacon from a second base station in the synchronous network; time difference of arrival between a first beacon from a first base station and a second beacon from a known transmitted reference signal, such as a Gold code in a GPS signal, a beacon transmitted by a base station associated with a second network known to be synchronous, such as a base station in a CDMA network not in the synchronous network. The time correction data can be used to determine a position of a mobile device as described above.

I. Determining Synchronization Status Using Standards-Based Signals

A base station may periodically communicate with a mobile device according to a protocol. The protocol may be a standardized protocol, such as the protocol specified for LTE (Long-Term Evolution) telecommunications by various standards, such as ETSI TS 136 211, ETSI TS 136 311, ETSI TS 136 355, ETSI TS 136 171, etc. Various information defined in these protocols may be used to determine whether a base station is a component of a synchronous network.

Protocols may define formats and parameters for messages to be sent from base stations to mobile devices and/or from mobile devices to base stations. A message may include one or more information elements. An information element may include one or more data fields.

A. System Information

Network 100 may transmit system information messages to mobile device 102 via broadcasts from a base station, for example, base station 104. Mobile device 102 may apply a system information acquisition procedure to acquire system information, for example, when selecting a cell upon power on or when subsequently re-selecting a cell. Using data included in a system information message, mobile device 102 can determine that network 100 is a synchronous network. In some embodiments, system information may include various information elements. For example, system information may be transmitted via a master information block, i.e., MasterInformationBlock (MIB) and one or more system information blocks (SIB) in accordance with specified protocol, for example, ETSI TS 136 331 v10, ETSI TS 136 331 v11, etc.

An MIB may be transmitted periodically according to a fixed schedule. A system information block message SystemInformationBlockTypeI (SIB-1) may be transmitted periodically and may indicate and configure scheduling additional system information blocks to be transmitted. The additional system information blocks, for example, a SystemInformationBlockType8 ("SIB-8") may carry information that can be used by mobile device 102 to determine whether network 100 is a synchronous network.

SIB-8 may include cell re-selection parameters for a CDMA2000 network, such as information about CDMA2000 frequencies and CDMA2000 neighboring cells. Because CDMA2000 is a synchronous network type, the presence of an SIB-8 information element within system information can indicate to a mobile device 102 that the network via which an SIB-8 was transmitted is a synchronous network.

It will be recognized that additional system information blocks may be used by mobile device 102 to determine whether network 100 is a synchronous network. For example, a SystemInformationBlockType16 ("SIB-16") may include information usable to determine whether network 100 is a synchronous network. SIB-16 may include information related to GPS time and Coordinated Universal Time (UTC). SIB-16 may be used by mobile device 102 to obtain UTC, GPS, local time, etc. The presence of an SIB-16 information element within system information can indicate to a mobile device 102 that the network via which an SIB-16 was transmitted is a synchronous network.

Even though detection of information related to SIB-8 and SIB-16 is described herein as an example, it will be recognized that other SIB messages suitable for determining network synchronization status may be used.

Figure 2A:
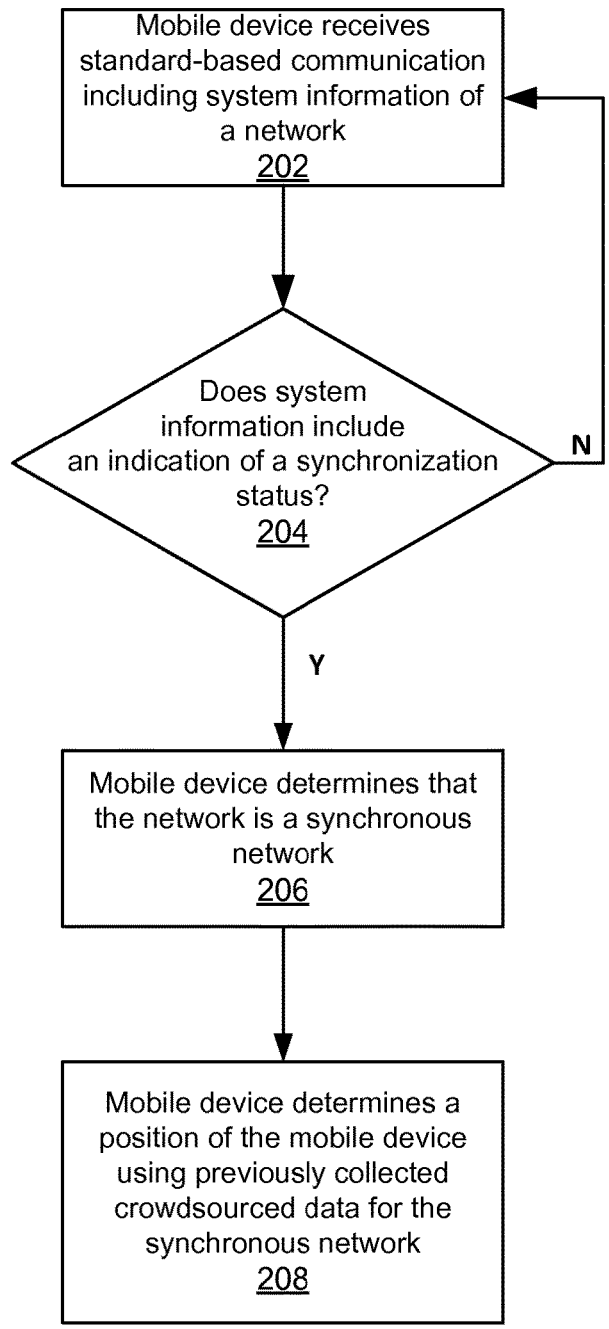
FIG. 2A illustrates example operations for determining a network synchronization status of a network using system information and determining a position of the mobile device.

FIG. 2A illustrates example operations for determining a network synchronization status of a network using system information and determining a position of the mobile device.

At operation 202, mobile device 102 receives a standards-based communication from a network which includes a base station, for example, base station 104. The communication may be a long-term evolution (LTE) protocol-compliant communication or a code division multiple access (CDMA) protocol-compliant communication. The communication may include system information broadcast by base station 104, such as an SIB-1 information element, an indication of a positioning reference signal (PRS), observed time difference of arrival (OTDOA) assistance data, or fine time assistance (FTA) data of a time assistance LTE positioning protocol (LPP) message.

At operation 204, mobile device 102 may determine whether the system information includes an indication of synchronization status. If so, the mobile device can determine that the mobile device is connected to a synchronous network. For example, as described below with respect to operation of 254 of FIG. 2B, operation 304 of FIG. 3, and operation 404 of FIG. 4, the received system information may include an SIB, an indication of a positioning reference signal (PRS), observed time difference of arrival (OTDOA) assistance data, or fine time assistance (FTA) data, which can be used by mobile device 102 to determine whether network 100 is a synchronous network.

If the system information does not include an indication that network 100 is synchronous, flow may optionally return to 202 to receive further system information that may include an indication that network 100 is synchronous. In some embodiments, if the system information does not include an indication that network 100 is synchronous after a certain period of time or after receiving a certain number of system information messages, mobile device 102 may determine that network 100 is asynchronous. If the system information includes an indication that network 100 is synchronous, flow may proceed to operation 206.

At operation 206, in response to determining that the received system information includes an indication that network 100 is synchronous, mobile device 102 can determine that network 100 is a synchronous network.

At operation 208, as a result of determining that network 100 is a synchronous network, mobile device 102 may use information received from base station 104 and other base stations associated with the synchronous network to determine a position of mobile device 102. For example, mobile device 102 can determine its position at least partially using previously collected crowdsourced assistance data for the synchronous network. Additionally or alternatively, in response to determining that the network 100 is a synchronous network, mobile device 102 may send an indication that the network is a synchronous network to a server.

Figure 2B:
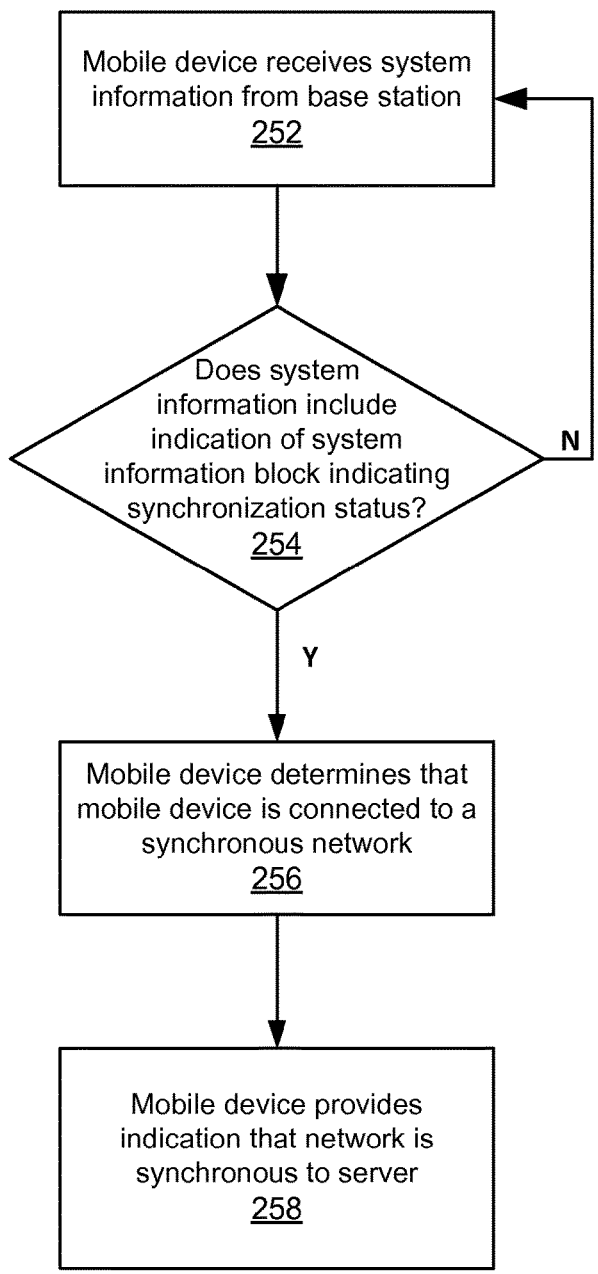
FIG. 2B. illustrates example operations for determining a network synchronization status of a network using system information.

FIG. 2B illustrates example operations for determining whether a base station is synchronous using system information, such as a system information block (SIB).

At operation 252, mobile device 102 receives system information from a network which includes a base station, for example, base station 104. The system information may include an SIB-1 information element. The system information may be system information that is periodically broadcast by base station 104. The communication between mobile device 102 and base station 104 may, in some implementations, be a long-term evolution (LTE) protocol-compliant communication.

At operation 254, mobile device 102 may determine whether the system information includes an indication of synchronization status. If so, mobile device 102 can determine that mobile device 102 is connected to a synchronous network. For example, the received system information can include an SIB that can be used by mobile device 102 to determine whether network 100 is a synchronous network. For example, mobile device 102 may determine whether a received SIB-1 includes an indication that an SIB-8 will be included in system information to be transmitted. Mobile device 102 may parse SIB-1 to determine a value of a field sib-MappingInfo to determine whether SIB-8 is present in a list of SIBs mapped to SIB-1. In another example, mobile device 102 may determine whether an SIB-8 was received by mobile device 102.

If the system information does not include an indication of an SIB indicating that network 100 is synchronous, flow may optionally return to 252 to receive further system information that may include another SIB message. In some embodiments, if the system information does not include an indication of an SIB indicating that network 100 is synchronous after a certain period of time or after receiving a certain number of system information messages, mobile device 102 may determine that network 100 is asynchronous. If the message includes an indication of an SIB indicating that network 100 is synchronous, flow may proceed to operation 256.

At operation 256, in response to determining that received system information included an indication of an SIB block usable to indicate that network 100 is synchronous, mobile device 102 can determine that network 100 is a synchronous network. Based on the determination that network 100 is synchronous, mobile device 102 can determine its position at least partially using previously collected crowdsourced assistance data for the synchronous network.

At operation 258, mobile device 102 can transmit an indication that network 100 is a synchronous network to server 110. Alternatively or additionally, in response to determining that the network 100 is a synchronous network, mobile device 102 may determine a position of the mobile device using previously collected crowdsourced assistance data for the synchronous network.

When network 100 is a synchronous network, information received by mobile device 102 from base station 104 may be usable for positioning. Mobile device 102 may provide information regarding a positioning reference signal received from base station 104 to server 110. Server 110 may use the received positioning information to determine a position of mobile device 102. Server 110 may collect received positioning information for use in future mobile device positioning.

In some embodiments, as a result of determining that network 100 is a synchronous network, mobile device 102 may use information received from base station 104 and information from other base stations associated with the synchronous network to determine a position of mobile device 102. For example, mobile device 102 can determine its position at least partially using previously collected crowdsourced assistance data for the synchronous network.

B. Positioning Reference Signal

A positioning reference signal (PRS) is another example of a signal that may be used for determining whether a network from which a signal is received is a synchronous network. Base station 104 may broadcast a PRS for use in mobile device positioning. Mobile device 102 can observe PRS signals received from multiple base stations (for example, base stations 104-108) and use the observed PRS signals to perform positioning using trilateration.

A PRS may be a PRS as defined for LTE, for example, as defined in ETSI TS 136 355 v10. A PRS may be used for timing (ranging) measurement of a mobile device or a user equipment from a base station to improve observed time difference of arrival (OTDOA) positioning performance. A PRS may be defined using one or more of bandwidth, offset, duration (for example, number of consecutive downlink subframes with positioning reference signals), periodicity, etc. Because PRS must be received from base stations that are synchronized with one another in order to be useful for positioning, when a mobile device can detect a PRS, the presence of the PRS can indicate to the mobile device that a network is synchronous.

Figure 3:
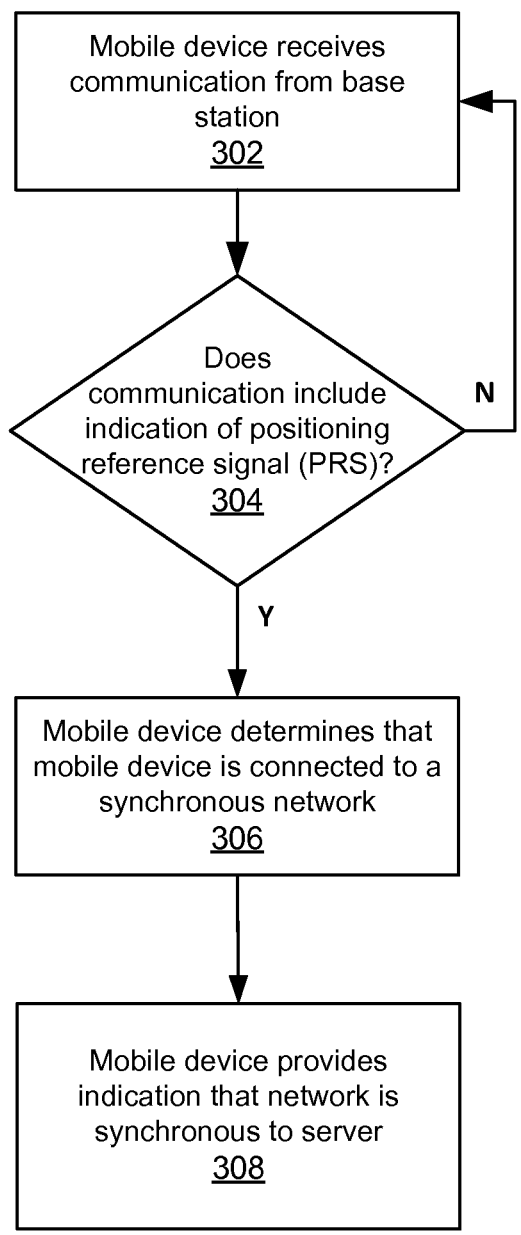
FIG. 3 illustrates example operations for determining a network synchronization status using a positioning reference signal.

FIG. 3 illustrates example operations for determining a network synchronization status using a positioning reference signal.

At operation 302, mobile device 102 receives a standards-based communication from a base station, for example, base station 104. For example, the communication may be a PRS.

In another example, the communication may be observed time difference of arrival (OTDOA) assistance data, such as OTDOA-ReferenceCellInfo as defined in ETSI TS 136 355 v10. OTDOA is a downlink positioning method. It is a multilateration method in which a user equipment or a mobile device measures the time of arrival (TOA) of signals received from multiple base stations. The TOAs from several neighbor base stations can be extracted from a TOA of a reference base station to form OTDOA. Geometrically, each time (range) difference determines a hyperbola, and a point at which multiple hyperbolas insect can be determined to be a location of the mobile device. Server 110 can provide OTDOA assistance data to mobile device 102 via base station 104. The OTDOA assistance data can optionally include a field, for example, prsInfo of information element OTDOA-ReferenceCellInfo indicating a PRS configuration of a reference cell.

At operation 304, mobile device 102 may determine whether the received communication includes an indication of a PRS. For example, mobile device 102 may determine whether a PRS is received. In another example, mobile device may determine whether OTDOA assistance data including an indication of a PRS configuration of a reference cell is received.

If the communication does not include an indication of a PRS, flow may optionally return to 302. If the communication includes an indication of a PRS, flow may proceed to operation 306.

At operation 306, in response to determining that received system information included an indication of a PRS, mobile device 102 can determine that network 100 is a synchronous network. Based on the determination that network 100 is synchronous, mobile device 102 can determine its position at least partially using previously collected crowdsourced assistance data for the synchronous network.

At operation 308, mobile device 102 can transmit an indication that network 100 is a synchronous network to server 110. Alternatively or additionally, in response to determining that the network 100 is a synchronous network, mobile device 102 may determine a position of the mobile device using previously collected crowdsourced assistance data for the synchronous network.

C. Observed Time Difference of Arrival (OTDOA) Assistance Data

Another technique that may be used for a mobile device to determine whether it is connected to a synchronous network involves determining whether OTDOA assistance data indicates network synchronization status. For example, a slot number offset parameter can help determine synchronization status.

Server 110 may transmit OTDOA assistance data to mobile device 102 via base station 104. OTDOA assistance data may be transmitted in accordance with OTDOA-ProvideAssistanceData, for example, as defined in ETSI TS 136 355 v10. OTDOA-ProvideAssistanceData may include OTDOA-NeighbourCellInfoList to provide a list of cells from which mobile device 102 is to measure PRS, ordered by priority of measurement.

OTDOA-NeighbourCellInfoList may include an EARFCN (absolute radio frequency channel number for e-UTRAN) parameter, a slotNumberOffset parameter, and a prs_SubframeOffset parameter. EARFCN may specify a radio frequency channel number for a neighbor cell. The slotNumberOffset parameter may specify a number of full slots from the beginning of a radio frame transmitted by a reference cell to the beginning of the closest subsequent radio frame of a neighbor cell. The prs_SubframeOffset parameter may specify an offset in number of subframes between the first PRS subframe in the reference cell on the reference carrier frequency layer and the first PRS subframe in the closest subsequent PRS burst of a neighbor cell on the neighbor cell carrier frequency layer. An expected reference signal time difference (RSTD) indicates a RSTD value that a device is expected to measure between a neighbor cell and a reference cell. The RSTD takes into account expected propagation time difference as well as transmit time difference of PRS positioning occasions between the two cells. Information of the reference cell may be indicated by, for example, an OTDOA-ReferenceCellInfo value received by mobile device 102.

If EARFCN for the cell from which OTDOA assistance data is received is the same as the EARFCN for a reference cell, the following example code may be used to evaluate if the two cells are synchronized, for an example system with 20 slots and 10 subframes in a frame. If "isSynchronized" is TRUE after evaluating the statements, then the two cells can be considered to be synchronized.

```
if( expectedRSTD >= 0.5msec )
{
    if (((2 * (Iprs_ref + prs_SubframeOffset - Iprs_nbr) +
1) % 20) == slotNumberOffset)
        isSynchronized = TRUE;
    else
        isSynchronized = FALSE;
}
else
{
    if (((2 * (Iprs_ref + prs_SubframeOffset -
Iprs_nbr) ) % 20 == slotNumberOffset ))
        isSynchronized = TRUE;
    else
        isSynchronized = FALSE;
}
```

Figure 4:
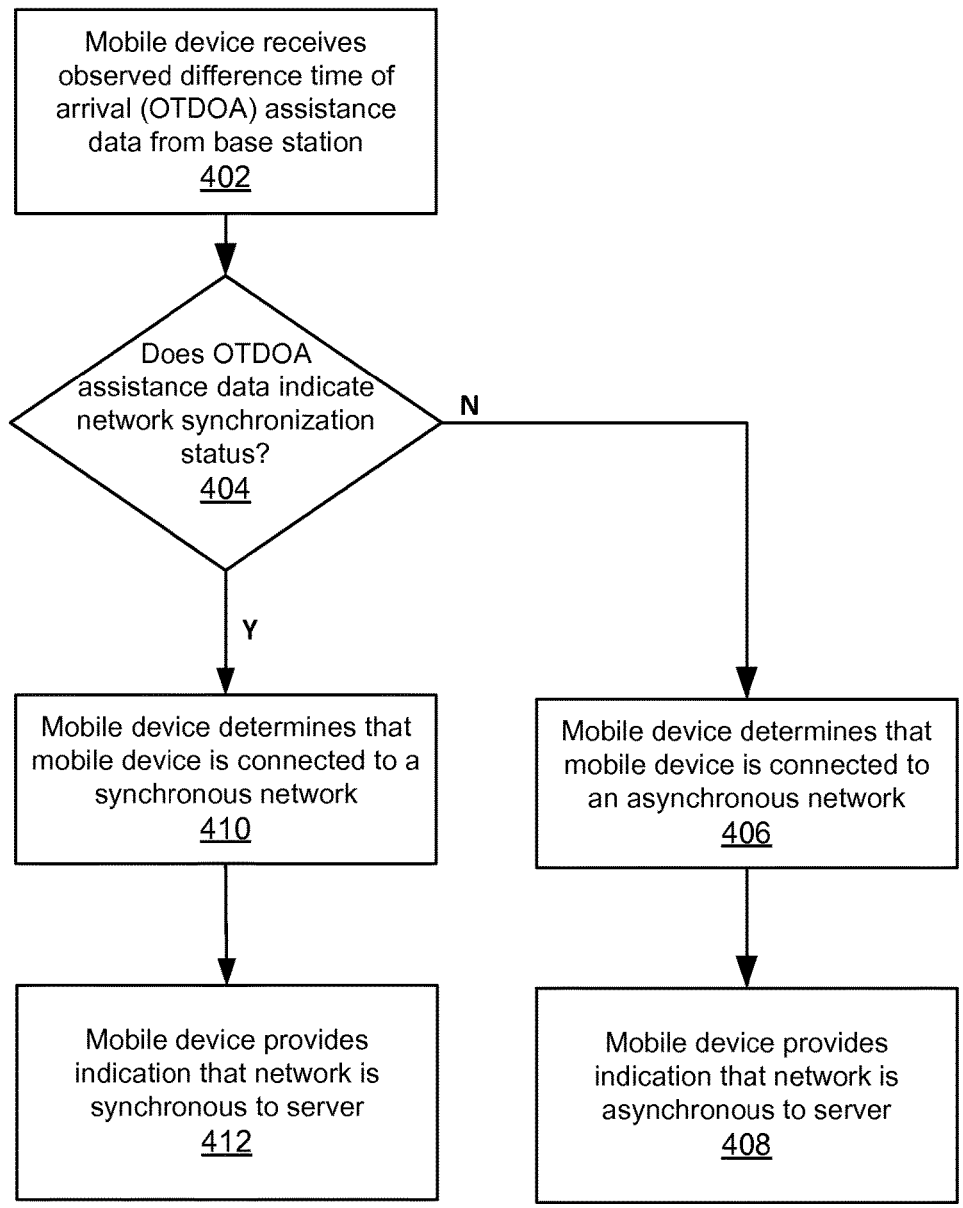
FIG. 4 illustrates example operations for determining a network synchronization status using observed time difference of arrival (OTDOA) assistance data.

In the above example code, $I_{PRS}$_ref and $I_{PRS}$_nbr may indicate $I_{PRS}$ configurations as defined in a standard such as ETSI TS 136 211 v10. $I_{PRS}$ refers to a PRS configuration index. $I_{PRS}$ may define, for example, a PRS periodicity and PRS subframe offset. $I_{PRS}$_ref may refer to a PRS configuration index for a reference cell and $I_{PRS}$_nbr may refer to a PRS configuration index for a neighbor cell. FIG. 4 illustrates example operations for determining a network synchronization status using OTDOA assistance data.

At operation 402, mobile device 102 receives a standards-based communication from a base station, for example, base station 104. For example, the communication may include OTDOA assistance data.

At operation 404, mobile device 102 may determine whether the received OTDOA assistance data indicates that the network from which the OTDOA assistance data was received is a synchronous network. For example, mobile device 102 may determine whether EARFCN for the cell from which OTDOA assistance data is received is the same as the EARFCN for a reference cell. If EARFCN for the cell from which OTDOA assistance data is received is the same as the EARFCN for a reference cell, PRS_SubframeOffset, $I_{PRS}$_ref and $I_{PRS}$_nbr values can be evaluated with respect to a slotNumberOffset value as described above. If the evaluation indicates that the mobile device 102 is receiving signals from a synchronized network, flow may proceed to 410. Otherwise, flow may proceed to 406.

At operation 406, because OTDOA assistance data does not indicate network synchronization status, as determined at 404, mobile device 102 can determine that network 100 is an asynchronous network.

At operation 408, mobile device 102 can transmit an indication that network 100 is an asynchronous network to server 110.

At operation 410, because OTDOA assistance data indicates network synchronization status, as determined at 404, mobile device 102 can determine that network 100 is a synchronous network.

At operation 412, mobile device 102 can transmit an indication that network 100 is a synchronous network to server 110. Alternatively or additionally, in response to determining that the network 100 is a synchronous network, mobile device 102 may determine a position of mobile device 102 using previously collected crowdsourced assistance data for the synchronous network.

A further technique for determining network synchronization status may use LTE positioning protocol (LPP) fine time assistance (FTA). Time assistance is the use of an LPP message to provide global navigation satellite system (GNSS) time to a mobile device 102. FTA adds a relationship between the GNSS system time and a current network time (for example, e-UTRAN time) to a time assistance LPP message. A fine time assistance message may be an LPP message as specified by ETSI TS 136 171 v9, for example, a message including information elements such as gnss-SystemTime, gnss-ReferenceTimeForCells, etc. When a mobile device 102 receives FTA information from network 100, mobile device 102 may determine in response to receiving the FTA information that network 100 is synchronous.

The approaches to determining network synchronization status discussed above use signals provided from network 100 to mobile device 102, which may be signals provided in accordance with standardized protocols. Below, additional techniques are described for a mobile device 102 to determine whether a network 100 from which signals are received is a synchronous network. Such techniques can be implemented directly on the mobile device without depending on adherence to LTE protocols.

II. Measured Time Difference of Arrival Approach to Determining Network Synchronization Status Mobile device 102 may determine a difference between a time at which a first reference signal, for example, from a first cell, arrives at mobile device 102 and a time at which a second reference signal, for example, from a second cell, arrives at mobile device 102. The difference between the time at which the first signal arrives at mobile device 102 and the time at which the second signal arrives at mobile device 102 may be referred to as a time difference of arrival (TDOA). If the TDOA remains sufficiently constant, such as varying by less than a threshold amount, over a period of time during which mobile device 102 is sufficiently stationary, mobile device 102 can determine that the network via which the reference signals were transmitted is a synchronous network.

Reference signals may be generated by base stations 104-108 for use by mobile device 102. Reference signals may be any periodically transmitted signal with a format or pattern that is recognizable to mobile device 102 as a reference signal, such as a positioning reference signal (PRS), a cell-specific reference signal (CRS), a primary synchronization signal (PSS), a secondary synchronization signal (SSS), a pilot signal of trilateration system (for example, an Advanced Forward Link Trilateration system), or other reference signal.

Mobile device 102 can measure a time of arrival of multiple reference signals. Mobile device 102 may measure the time of arrival by observing, for example, two or more repetitions of a pattern in the reference signal. Mobile device 102 can repeatedly (for example, periodically) determine a TDOA over a period of time, for example, at 0.16 second intervals, to determine an extent to which the TDOA changes over the period of time.

The period of time over which a TDOA may be determined, also referred to as a "reference period of time," may be a function of the offset and clock stabilities of transmitters from which the reference signals are received as well as the accuracy of the TDOA measurements themselves. The minimum TDOA observation time may be determined according to following formula:

$$\sqrt{2}\left(\frac{\text{typical accuracy of } TDOA \text{ measurements (seconds)}}{\text{target synchronization (ppb)}}\right).$$

For example, if a user is trying to determine whether two clocks are synchronized to within, for example, 10 parts per billion (ppb), and the typical accuracy of the TDOA measurements is 100 ns, then the two clocks should be observed over at least $\sqrt{2} \times 100 \times 10^{-9}$ sec/$(10 \times 10^{-9})$=14.14 seconds. If the TDOA as observed at 0 second varies from the TDOA as observed at 14.14 seconds by less than 10 ppb, the clocks associated with the reference signals may be considered to be synchronized.

Mobile device 102 can use reference signals generated by base stations 104-108 and, in some cases, other sources, to determine whether a network from which a reference signal is received is a synchronous network. For example, if mobile device 102 is stationary for a period of time and the TDOA between a first reference signal received from a first base station and a second reference signal from a second base station does not exceed a target synchronization during that period of time, mobile device 102 can determine that the network generating the reference signals is a synchronous network. In another example, mobile device 102 can determine a TDOA between a reference signal received from a base station and a reference signal from another source, such as a GNSS source, an Institute of Electrical and Electronics Engineers (IEEE) standard 1588 source, or another known transmitted reference signal, or any combination thereof. If mobile device 102 is stationary for a period of time and a TDOA of a first reference signal from a base station and a second reference signal, for example, a GPS reference signal, does not drift over that period of time, mobile device 102 can determine that the network generating the first reference signal is a synchronous network. During the period of time, mobile device 102 may determine the TDOA at least twice, or repeatedly or periodically.

When a mobile device 102 is not stationary, a measurement of a reference signals made by mobile device 102 may not be easily usable to determine whether drift is occurring between a first reference signal and a second reference signal. However, it is understood that, although more complicated, compensation for the mobile device's movement is possible, and hence, a mobile-device-movement-compensated TDOA of a first reference signal and a second reference signal can be compared to help determine whether a network is synchronous. Determining whether mobile device 102 is stationary (or sufficiently stationary) allows mobile device 102 to accurately determine whether drift occurs between reference signals without compensating for the movement of the mobile device.

Various approaches can be used for determining whether a mobile device is stationary for a period of time, for example, during which TDOA is determined.

For example, a GNSS location, for example, GPS location, can be determined for mobile device 102 for a period of time. If the location does not vary, or varies by less than a threshold amount (for example, a threshold amount in the range of 0-10 meters, such as a threshold amount in the range of 0-5 meters, for example, a threshold of less than one meter), the mobile device 102 may determine that mobile device 102 is sufficiently stationary. For example, mobile device 102 may be determined to be sufficiently stationary when error due to user motion is one order of magnitude smaller or less than the largest of other error sources, such as multipath-induced error. For example, if the largest source of error among all sources of error is multipath-induced error, and the multipath-induced error is 100 meters, the threshold can be 10 meters or less and mobile device 102 is "sufficiently stationary" when mobile device 102 moves 10 meters or less during the period of time. Mobile device 102 may determine that mobile device 102 is not stationary if the location varied by more than the threshold amount.

In another example, mobile device 102 may determine that mobile device 102 is stationary if mobile device 102 is in a charging state while measuring reference signals. In some embodiments, additional position information or data available from mobile device 102 may be used to confirm that mobile device 102 is not in motion while it is charging (for example, mobile device 102 may be in motion while being charged in a moving vehicle.)

Figure 5:
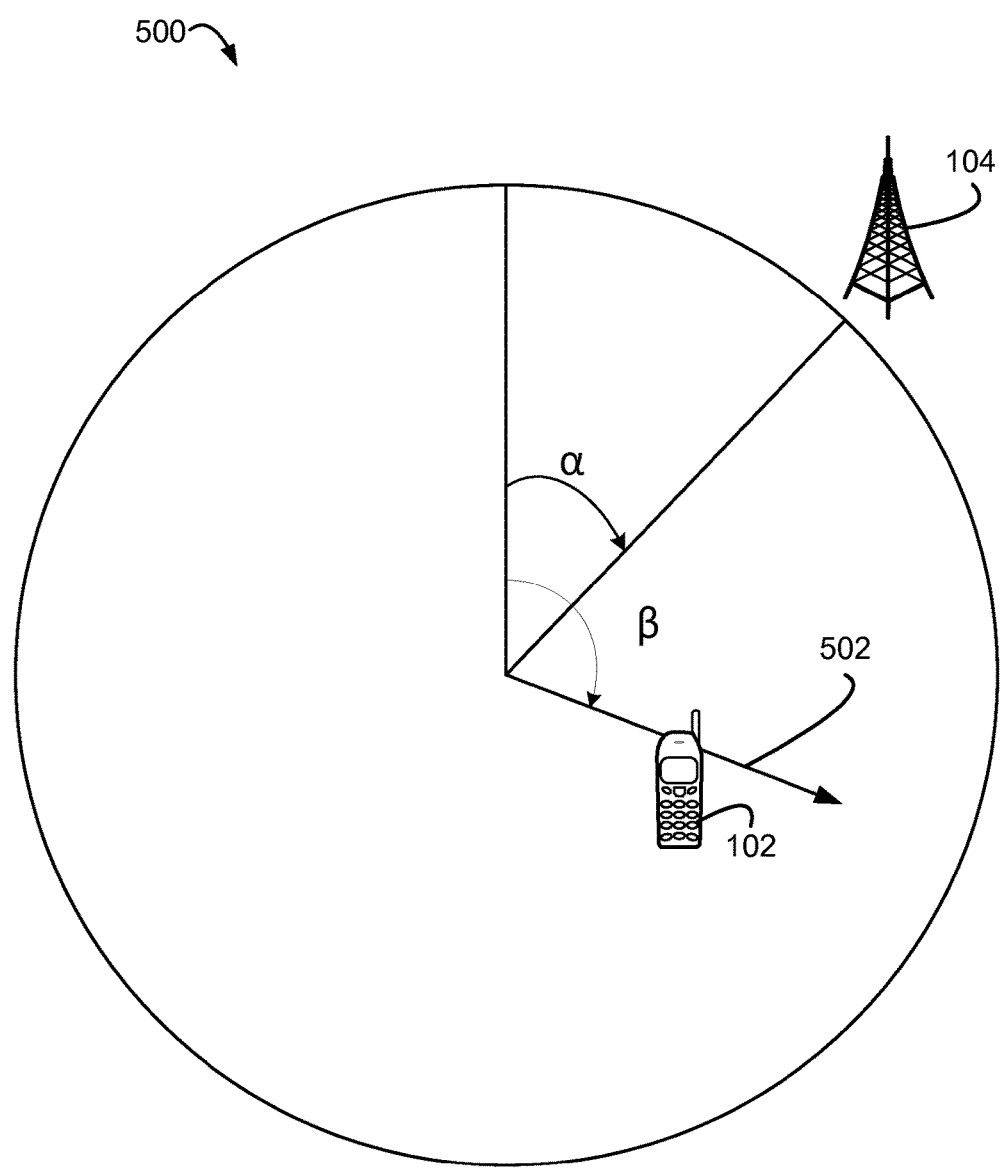
FIG. 5 illustrates a mobile device and a base station relative to an arbitrary frame of reference, as used to determine a Doppler offset.

In an additional example, mobile device 102 may determine that mobile device 102 is stationary using an indication of the Doppler Effect. For example, mobile device 102 may observe a Doppler offset of the received signals from one or more base stations 104-108. FIG. 5 illustrates a mobile device 102 traveling relative to a base station 104. Mobile device 102 receives a signal from base station 104. If a frequency received by mobile device 102 from base station 104 differs from a known frequency of the signal transmitted by base station 104, mobile device 102 can determine that a Doppler offset in the frequency is occurring due to movement of mobile device 102 if the mobile device has an accurate absolute frequency reference (for example, from GNSS). If the frequency received by mobile device 102 from base station 104 matches or approximately matches the frequency emitted by base station 104, mobile device 102 can determine that mobile device 102 is stationary.

In FIG. 5, mobile device 102 may be moving along a vector as shown at 502. Vector 502 is at an angle $\beta$ relative to an arbitrary reference frame 500. Base station 104 may be located at an angle $\alpha$ relative to the arbitrary reference frame. Mobile device 102 may determine a Doppler offset value periodically, for example, at one second intervals. Mobile device 102 may determine that the device is stationary when the change in Doppler offset values fall below a threshold value. However, if Doppler is observed from only one cell, the change in Doppler values could also drop below the threshold if the user travelled around the cell on a circular path, or if the mobile user clock drifted in the opposite direction of the real user motion. To limit errors in motion determination, the mobile device could make Doppler measurements from multiple cells. A determination by mobile device 102 of whether mobile device 102 is or is not in motion could then be done by cross-checking the multiple measurements.

In one example, a Doppler offset may be observed by mobile device 102 with regard to signals acquired from a base station (for example, base station 104) as follows:

$$s = \frac{\Delta f_1 c}{f_0 \cos(\beta - \alpha)},$$

where $f_1$ is a frequency associated with a signal transmitted by a base station (for example, base station 104), $f_0$ is a frequency received by mobile device 102, c is the speed of light, s is a velocity vector of motion of mobile device 102, β is an angle with respect to an arbitrary reference frame, and a is an angle of a base station (for example, base station 104) with respect to the reference frame. Signals transmitted by base stations may be positioning reference signals (PRS). Where the magnitude of velocity vector s falls below a threshold amount, such as a threshold in the range of 0.05-1.0 m/s, for example, 0.3 m/s, mobile device 102 can determine that the mobile device is stationary.

In a further example, mobile device 102 may determine that mobile device 102 is stationary if reference signals are measured at a time of day when a mobile device user is typically not moving. For example, mobile device 102 may be typically stationary between the hours of 2 AM and 4 AM, when a typical mobile device user may be sleeping. In some embodiments, additional position information or data available from mobile device 102 may be used to confirm that mobile device 102 is not in motion at a particular time of day. Mobile device 102 may determine that mobile device 102 is not stationary during a time of day when the mobile device user is typically in motion. The range of times of day used for determination of whether mobile device 102 is stationary may be based on default values, historical data, demographic data, etc.

It will be recognized that other mobile device components (for example, an inertial sensor, such as an accelerometer) and other techniques may be used to determine whether mobile device 102 is stationary over a period of time. For example, if an acceleration signal produced by an accelerometer of mobile device 102 does not vary by more than a reference acceleration, for example, a predetermined acceleration including magnitude and direction that can be used to distinguish between user-based movement (for example, a stationary user who is holding the mobile device and the mobile device is in motion due to the user's movement of the user's hands, etc., although the user remains stationary, i.e. the user's position relative to the earth remains constant) and movement that can affect the synchronous/asynchronous determination, over a period of time, mobile device 102 may determine that mobile device 102 is stationary over the period of time.

In some embodiments, server 110, in lieu of mobile device 102, may determine a TDOA between reference signals. For example, mobile device 102 may measure one or more reference signals and send information regarding the measurement or measurements to server 110. Server 110 can compare the measured data received from mobile device 102 with other measured data received from mobile device 102 to determine a TDOA. Server 110 can compare measured data received from mobile device 102 with reference signal data originating from a source other than a base station. Reference signal data originating from a source other than a base station may be received by server 110 from mobile device 102 or from a source other than mobile device 102. Server 110 may determine whether mobile device 102 is stationary using data received from mobile device 102 and/or other data. Server 1110 may use a determined TDOA and a determination of whether mobile device 102 is stationary to determine whether a network 100 is synchronous.

Figure 6:
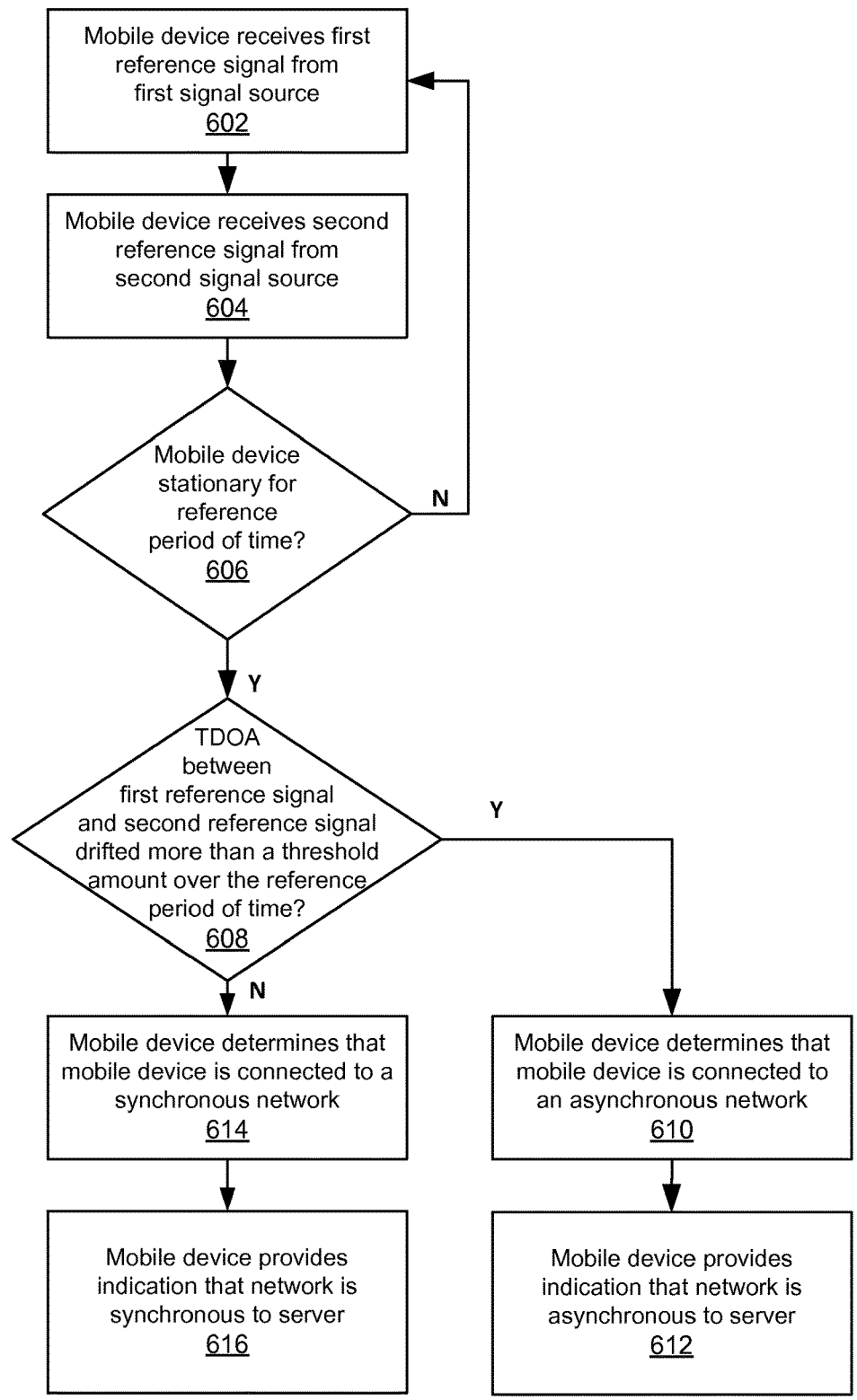
FIG. 6 illustrates example operations for determining a network synchronization status by measuring time difference of arrival.

FIG. 6 illustrates example operations for determining a network synchronization status by measuring TDOA.

At operation 602, mobile device 102 can receive a first reference signal transmitted by a first signal source, for example, base station 104 associated with a first cell. The first reference signal may be, for example, a PRS, a CRS, a PSS, an SSS, a pilot signal, or other reference signal. A cell-specific reference signal may be a pilot signal inserted into a downlink signal that is used by a user equipment to perform downlink channel estimation in order to perform coherent demodulation of the information-bearing parts of the downlink signal.

At operation 604, mobile device 102 can receive a second reference signal associated with a second signal source (for example, base station 106 associated with a second cell, a GNSS source, an IEEE 1588 source, or another known transmitted reference signal, or any combination thereof, etc.).

At operation 606, mobile device 102 can determine whether mobile device 102 was stationary or sufficiently stationary for a reference period of time during which the first reference signal and the second reference signal were received. If the mobile device 102 determines that mobile device 102 was not stationary or sufficiently stationary, flow may return to operation 602. If the mobile device 102 determines that mobile device 102 was stationary, flow may proceed to operation 608.

At operation 608, mobile device 102 can determine whether a drift was detected between the first reference signal and the second reference signal, for example, based on a TDOA between the first reference signal and the second reference signal measured repeatedly over a period of time. If the mobile device 102 determines that TDOA drifted by more than a threshold amount over the reference period of time, flow may return to operation 510. If the mobile device 102 determines that the TDOA remained sufficiently constant over the reference period of time (for example, TDOA did not drift by more than a threshold amount over the reference period of time or TDOA drifted by less than the threshold amount over the reference period of time), flow may proceed to operation 514.

At operation 610, mobile device 102 may determine, based on the TDOA drift while mobile device 102 remained stationary, that the network from which the first reference signal was received is an asynchronous network.

At operation 612, mobile device 102 can transmit an indication that network 100 is an asynchronous network to server 110.

At operation 614, mobile device 102 may determine, based on a relatively constant TDOA over a period of time during which mobile device 102 remained stationary, that the network from which the first reference signal was received is a synchronous network.

At operation 616, mobile device 102 can transmit an indication that network 100 is a synchronous network to server 110. Alternatively or additionally, in response to determining that the network 100 is a synchronous network, mobile device 102 may determine a position of mobile device 102 using previously collected crowdsourced assistance data for the synchronous network.

III. Clock Bias Variability Approach to Determining Network Synchronization Status When mobile device 102 uses information from base stations 104-108 to determine a mobile device position, the mobile device 102 may also determine a clock bias for each base station. Calculating a position of a mobile device may involve determining a clock bias of a base station clock signal relative to a reference clock signal, such as a GPS clock signal. When a clock bias for a base station has no or minimal variability over time, it can be determined that the base station is associated with a synchronous network.

A first illustrative approach to determining a network synchronization status using clock bias is a crowdsourcing approach. One or more mobile devices 102 can determine a clock bias for a base station 104 and report the determined clock biases to a server 110. Using the information provided from the multiple mobile devices, server 110 can determine if the clock bias is drifting over a period of time. If the drift exceeds a threshold amount, for example, a drift value in a range of ±1 μs-100 μs, such as ±1.5-5 μs, for example, 3 μs, clock bias may be determined to be drifting. The period of time over which the clock bias is determined may be, for example, a period of minutes, hours or days. In another example, the time over which the clock bias can be observed to determine whether the clock bias has drifted can be computed in a manner similar to that discussed above with reference to the reference period of time for observing a TDOA measurement of two reference signals.

Figure 7A:
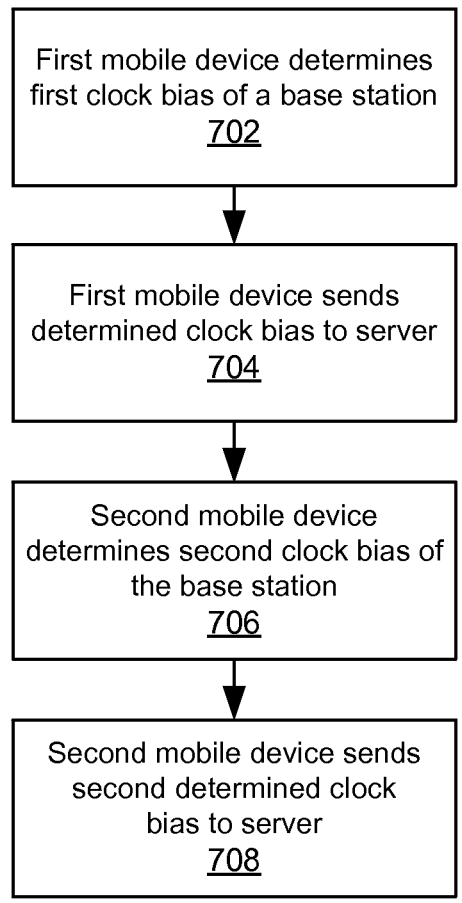
FIG. 7A illustrates example operations for determining clock bias values by a first mobile device and a second mobile device.

FIG. 7A illustrates example operations for determining clock bias values by a first mobile device and a second mobile device.

At operation 702, a first mobile device, such as mobile device 102, may measure a clock bias of a base station, for example, base station 104. The clock bias may be a bias of a base station clock signal relative to a reference clock or reference time from a known synchronous system. Examples of reference clocks or reference times from known synchronous systems could include one or more of a global navigation satellite system, an IEEE 1588 source, a radio access technology that is synchronous, or an oscillator of the mobile device, or any combination thereof. At operation 704, the first mobile device may transmit data indicating the determined clock bias to server 110.

At operation 706, a second mobile device may measure a clock bias of the base station 104 as discussed above with reference to operation 702. At operation 708, the second mobile device may transmit data indicating the determined clock bias to server 110. The second mobile device may determine a clock bias at a different time from when the first mobile device determines a clock bias. In this manner, server 110 can determine whether the clock bias of base station 104 is drifting over a period of time.

Figure 7B:
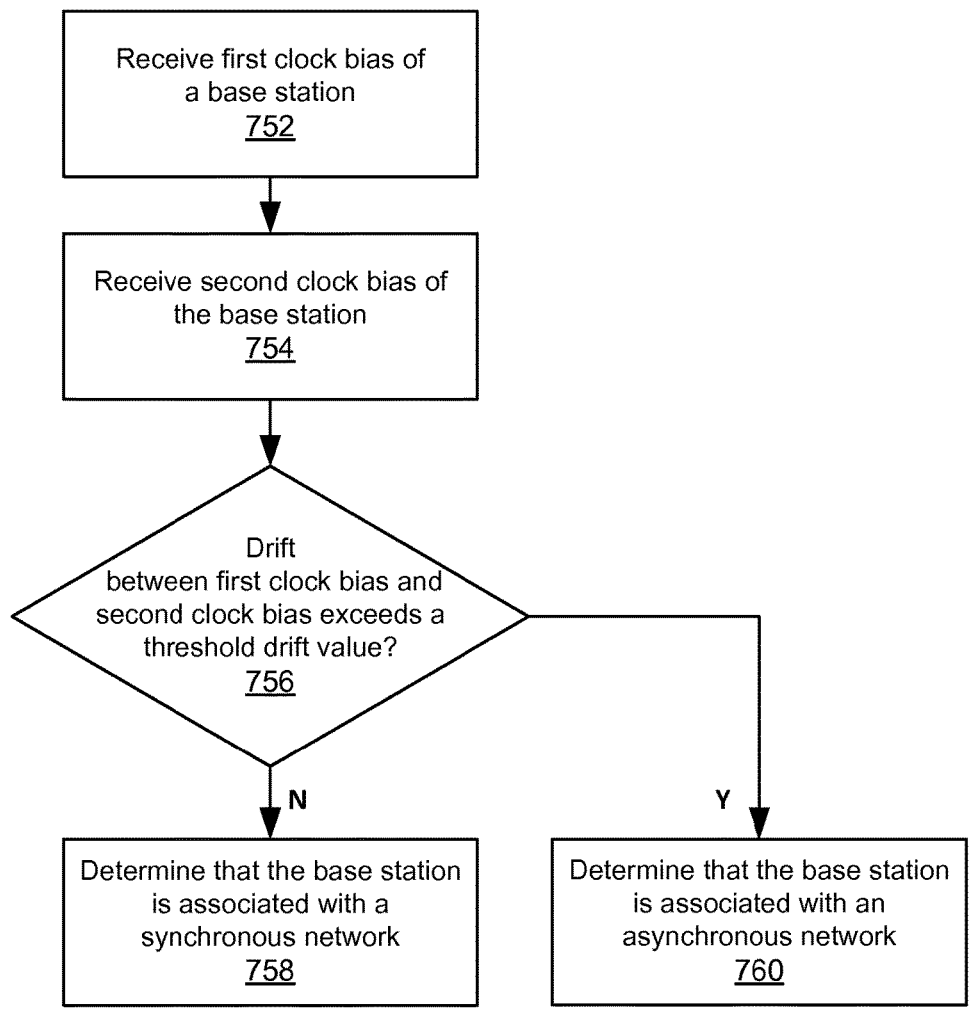
FIG. 7B illustrates example operations for determining a network synchronization status using two clock bias values of a base station.

FIG. 7B illustrates example operations for determining a network synchronization status using two clock bias values of a base station measured by one or more mobile devices.

At operation 752, server 110 may receive data from a first mobile device indicating a first clock bias of a base station determined by the first mobile device. For example, the first clock bias may be a clock bias of a base station, for example, base station 104, measured by mobile device, for example, mobile device 102, at a first time. The clock bias may be determined as discussed above with reference to operation 702 of FIG. 7A.

At operation 754, server 110 may receive data indicating a second clock bias of the base station. The second clock bias of the base station may be determined by a second mobile device at the first time or a second time. For example, the second clock bias may be determined as discussed above with reference to operation 702 or 706 of FIG. 7A. Therefore, server 110 may receive the data indicating the first clock bias from the first mobile device and receive data indicating the second clock bias from the second mobile device. Alternatively, the second clock bias of the base station may be determined by the first mobile device at a second time different from the first time. Hence, server 110 may receive data indicating the first clock bias and receive data indicating the second clock bias from the same mobile device.

At operation 756, server 110 may determine whether a drift between the first clock bias of base station 104 as determined by the first mobile device and the second clock bias of base station 104 as determined by the first or the second mobile device exceeds a threshold drift value. If the drift exceeds a threshold drift value, flow may proceed to operation 760. If the drift does not exceed a threshold drift value, flow may proceed to operation 758.

At operation 758, based on a determination that the drift between the first clock bias and the second clock bias does not exceed the threshold drift value, server 110 may determine that base station 104 is associated with a synchronous network.

At operation 760, based on a determination that the drift between the first clock bias and the second clock bias exceeds the threshold drift value, server 110 may determine that base station 104 is associated with an asynchronous network.

As described above, in some embodiments, at various times when mobile device 102 determines a clock bias, mobile device 102 can report the clock bias to server 110, and server 110 can determine if the clock bias is drifting over time, for example, over a period of hours, days, or relative to a reference period of time, etc. Alternatively, mobile device 102 can store clock biases determined at different times and mobile device 102 can determine if the clock bias is drifting over time.

Figure 7C:
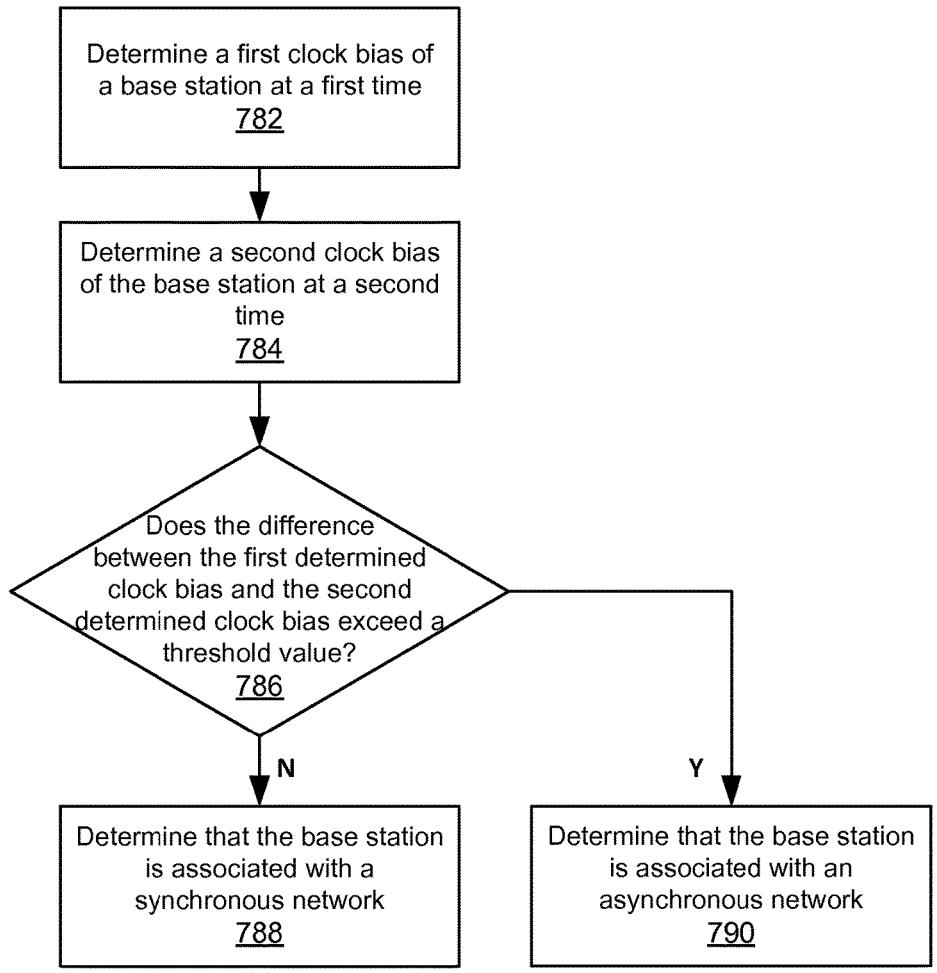
FIG. 7C illustrates example operations for determining a network synchronization status by a mobile device using clock bias values of a base station at different times.

FIG. 7C illustrates example operations for determining a network synchronization status by a mobile device using clock bias values of a base station at different times.

At operation 782, a mobile device, such as mobile device 102, may determine a first clock bias of a base station, for example, base station 104, as discussed above with reference to operation 702 of FIG. 7A, at a first time.

At operation 784, mobile device 102 may determine a second clock bias of base station 104, as discussed above with reference to operation 702 of FIG. 7A, at a second time.

At operation 786, mobile device 102 may determine whether the first clock bias of base station 104 as determined by mobile device 102 at the first time differs from the second clock bias of base station 104 as determined by mobile device 102 at the second time. If the difference exceeds a threshold value, flow may proceed to operation 790. If the difference does not exceed a threshold value, flow may proceed to operation 788.

At operation 788, based on a determination that the difference between the first clock bias and the second clock bias does not exceed the threshold value, mobile device 102 may determine that base station 104 is associated with a synchronous network. Based on the determination that network 100 is synchronous, mobile device 102 can determine its position at least partially using previously collected crowdsourced assistance data for the synchronous network. Alternatively, or additionally, in response to determining that the network 100 is a synchronous network, mobile device 102 may determine a position of mobile device 102 using previously collected crowdsourced assistance data for the synchronous network. While various implementations disclosed herein where a mobile device determines that network 100 is synchronous, it is understood that in other implementations, the mobile device may receive an indication that the network is synchronous by, for example, receiving information identifying base stations in the network on a whitelist, as discussed with reference to operations 136 and 158 of FIGS. 1C and 1E, from server 110. In such implementations, the mobile device may receive an indication from a server that a network is a synchronous network, or a base station is associated with a synchronous network, and may, based on the indication, determine its position at least partially using previously collected crowdsourced assistance data for the synchronous network.

At operation 790, based on a determination that the difference between the first clock bias and the second clock bias exceeds the threshold value, mobile device 102 may determine that base station 104 is associated with an asynchronous network.

When mobile device 102 determines that a network is synchronous using the approaches described above in sections I-III, mobile device 102 may store a list of base stations associated with synchronous networks or a list of synchronous networks (i.e., a whitelist), or provide information indicating that a network is synchronous to server 110, which may store a whitelist of base stations associated with synchronous networks or a whitelist of synchronous networks.

Similarly, when mobile device 102 determines that a network is asynchronous, mobile device 102 may store a list of base stations associated with asynchronous networks or a list of synchronous networks (i.e., a blacklist) or provide information indicating that a network is asynchronous to server 110, which may store a blacklist of base stations associated with asynchronous networks or a blacklist of synchronous networks.

Figure 8:
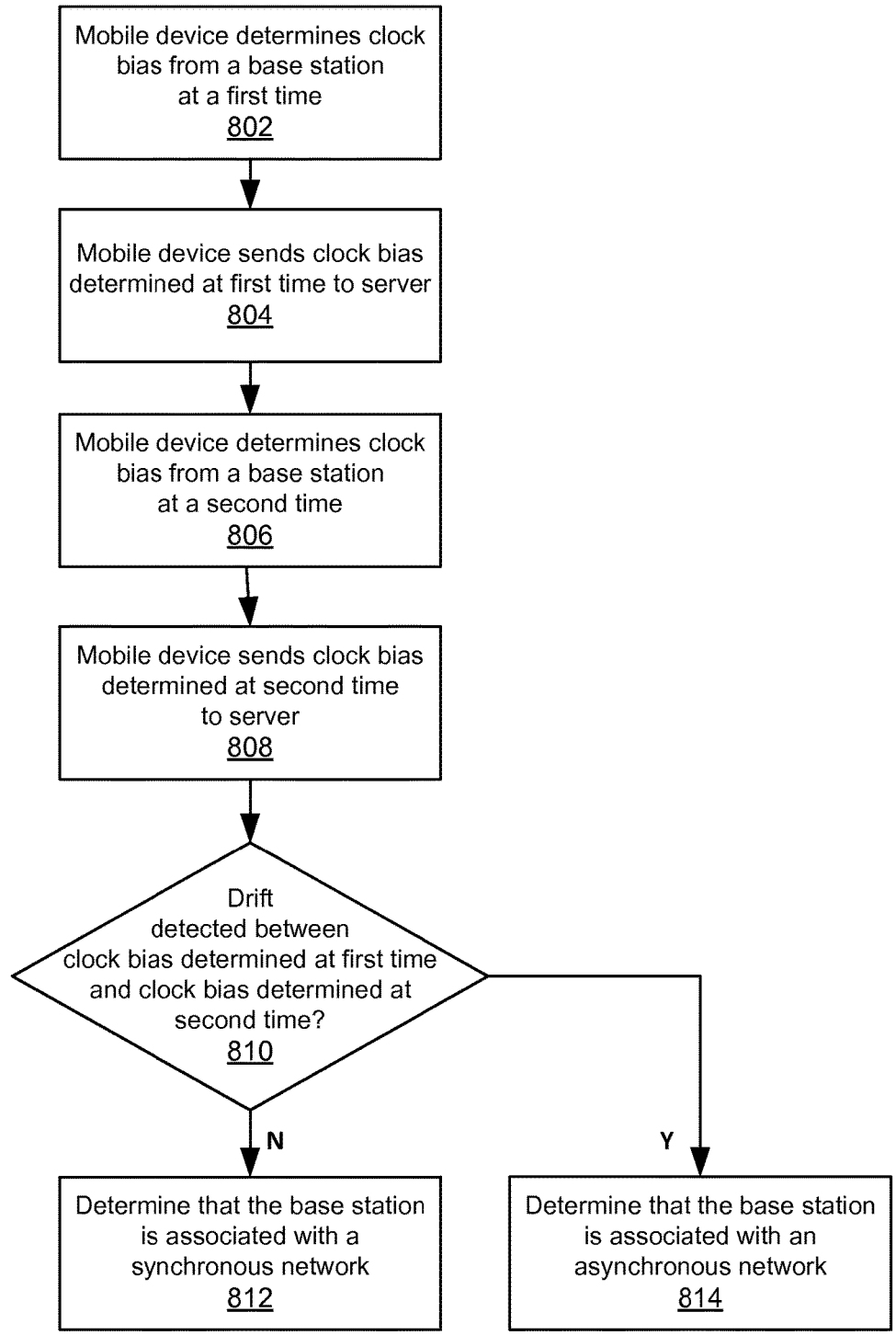
FIG. 8 illustrates example operations for determining a network synchronization status using clock bias values determined at multiple times by a single mobile device.

FIG. 8 illustrates example operations for determining a network synchronization status using clock bias values determined at multiple times by a single mobile device.

At operation 802, mobile device 102 may determine a clock bias of base station 104 at a first time. At operation 804, mobile device 102 may transmit data indicating the determined clock bias to a server 110.

At operation 806, mobile device 102 may determine a clock bias of base station 104 at a second time. At operation 808, mobile device 102 may transmit data indicating the determined clock bias to a server 110.

At operation 810, server 110 may determine whether the clock bias of base station 104 as determined by mobile device 102 at the first time differs from the clock bias of base station 104 as determined by mobile device 102 at the second time. If the difference exceeds a threshold drift value, flow may proceed to operation 814. If the difference does not exceed a threshold drift value, flow may proceed to operation 812.

At operation 812, based on a determination of no drift (or limited drift) between the clock bias determined at the first time and the clock bias determined at the second time, server 110 may determine that base station 104 is associated with a synchronous network.

At operation 814, based on a determination of drift between the clock bias determined at the first time and the clock bias determined at the second time, server 110 may determine that base station 104 is associated with an asynchronous network.

When mobile device 102 determines that a network is synchronous using the approaches to determining network synchronization status described above in sections I-III, mobile device 102 can provide information indicating that a network is synchronous to server 110. Server 110 may store a list of base stations associated with synchronous networks (i.e., a whitelist). A whitelist stored by server 110 may be a list of base station identifiers indicating base stations associated with synchronous networks or a list of network identifiers indicating synchronous networks. Server 110 may provide a whitelist to mobile device 102. Mobile device 102 may use the whitelist to determine base stations usable for position analysis.

Similarly, when mobile device 102 determines that a network is asynchronous, mobile device 102 can provide information indicating that a network is asynchronous to server 110. Server 110 may store a list of base stations associated with asynchronous networks (i.e., a blacklist). A blacklist stored by server 110 may be a list of base station identifiers indicating base stations associated with asynchronous networks or a list of network identifiers indicating asynchronous networks. Server 110 may provide a blacklist to mobile device 102. Mobile device 102 may use the blacklist to determine base stations to avoid using for position analysis.

In some situations, a base station associated with a synchronous network may be asynchronous. For example, a base station may be a small cell, such as a femtocell. When mobile device 102 determines that a base station 104 is an asynchronous base station, for example, when base station 104 is a femtocell or a small cell, mobile device 102 may send information to server 110 indicating that base station 104 is an asynchronous base station. When server 110 receives an indication that that base station 104 is an asynchronous base station, server 110 may add base station 104 to a blacklist.

IV. Computer System and Mobile Device System

Figure 9:
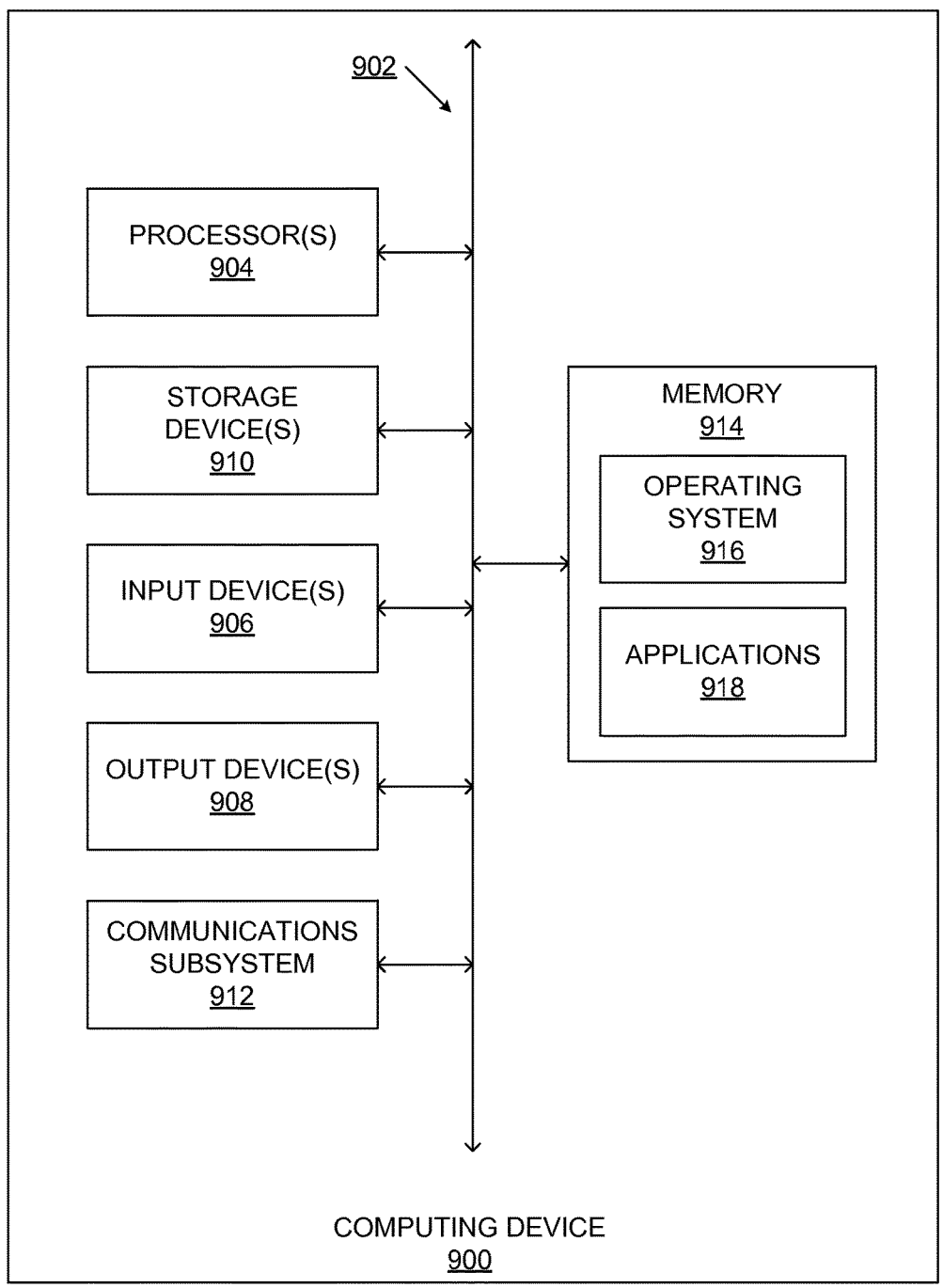
FIG. 9 illustrates an example of a computing system in which one or more embodiments may be implemented.

FIG. 9 provides a schematic illustration of one embodiment of a computer system 900 that can perform the methods provided by various other embodiments, as described herein, and/or can function as the host computer system, a remote kiosk/terminal, a point-of-sale device, a mobile device, and/or a computer system. FIG. 9 is meant only to provide a generalized illustration of various components, any or all of which may be utilized as appropriate. FIG. 9, therefore, broadly illustrates how individual system elements may be implemented in a relatively separated or relatively more integrated manner.

Computer system 900 is shown comprising hardware elements that can be electrically coupled via a bus 902 (or may otherwise be in communication, as appropriate). The hardware elements may include one or more processors 904, including without limitation one or more general-purpose processors and/or one or more special-purpose processors (such as digital signal processing chips, graphics acceleration processors, and/or the like); one or more input devices 906, which can include without limitation a mouse, a keyboard and/or the like; and one or more output devices 908, which can include without limitation a display device, a printer and/or the like.

Computer system 900 may further include (and/or be in communication with) one or more non-transitory storage devices 910, which can comprise, without limitation, local and/or network accessible storage, and/or can include, without limitation, a disk drive, a drive array, an optical storage device, a solid-state storage device such as a random access memory (RAM) and/or a read-only memory (ROM), which can be programmable, flash-updateable and/or the like. Such storage devices may be configured to implement any appropriate data stores, including without limitation, various file systems, database structures, and/or the like.

Computer system 900 might also include a communications subsystem 912, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or similar communication interfaces. A computing system may include one or more antennas for wireless communication as part of communications subsystems 912 or as a separate component coupled to any portion of the system. Communications subsystem 912 may permit data to be exchanged with a network (such as the network described below, to name one example), other computer systems, and/or any other devices described herein. In many embodiments, the computer system 900 will further comprise a non-transitory working memory 914, which can include a RAM or ROM device, as described above.

Computer system 900 also can comprise software elements, shown as being currently located within working memory 914, including an operating system 916, device drivers, executable libraries, and/or other code, such as one or more application programs 918, which may comprise computer programs provided by various embodiments, and/or may be designed to implement methods, and/or configure systems, provided by other embodiments, as described herein. Merely by way of example, one or more procedures and/or modules described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as storage device(s) 910 described above. In some cases, the storage medium might be incorporated within a computer system, such as computer system 900. In other embodiments, the storage medium might be separate from a computer system (for example, a removable medium, such as a compact disc), and/or provided in an installation package, such that the storage medium can be used to program, configure and/or adapt a general purpose computer with the instructions/code stored thereon. These instructions might take the form of executable code, which is executable by computer system 900 and/or might take the form of source and/or installable code, which, upon compilation and/or installation on computer system 900 (for example, using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an system configured to provide some or all of the features described herein can comprise hardware and/or software that is specialized (for example, an application-specific integrated circuit (ASIC), a software method, etc.) or generic (for example, processor(s) 904, application programs 918, etc.) Further, connection to other computing devices such as network input/output devices may be employed.

Some embodiments may employ a computer system (such as the computer system 900) to perform methods in accordance with the disclosure. For example, some or all of the procedures of the described methods may be performed by computer system 900 in response to processor 904 executing one or more sequences of one or more instructions (which might be incorporated into operating system 916 and/or other code, such as an application program 918) contained in working memory 914. Such instructions may be read into working memory 914 from another computer-readable medium, such as one or more of storage device(s) 910. Merely by way of example, execution of the sequences of instructions contained in working memory 914 might cause processor(s) 904 to perform one or more procedures of the methods described herein.

The terms "machine-readable medium" and "computer-readable medium," as used herein, refer to any medium that participates in providing data that causes a machine to operate in a specific fashion. In an embodiment implemented using computer system 900, various computer-readable media might be involved in providing instructions/code to processor(s) 904 for execution and/or might be used to store and/or carry such instructions/code (for example, as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as storage device(s) 910. Volatile media include, without limitation, dynamic memory, such as working memory 914. Transmission media include, without limitation, coaxial cables, copper wire and fiber optics, including the wires that comprise bus 902, as well as the various components of communications subsystem 912 (and/or the media by which communications subsystem 912 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to processor(s) 904 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 900. These signals, which might be in the form of electromagnetic signals, acoustic signals, optical signals and/or the like, are all examples of carrier waves on which instructions can be encoded, in accordance with various embodiments of the invention.

Communications subsystem 912 (and/or components thereof) generally will receive the signals, and bus 902 then might carry the signals (and/or the data, instructions, etc. carried by the signals) to working memory 914, from which processor(s) 904 retrieves and executes the instructions. The instructions received by working memory 914 may optionally be stored on a non-transitory storage device 910 either before or after execution by processor(s) 904.

Communications subsystem 912 may serve as a means for transmitting or receiving standards-based communication, or other communications among servers, base stations, and mobile devices. For example, communications subsystem 912 may serve as a means for receiving a synchronization status of a network associated with one or more base stations. Communications subsystem 912, alone or in combination with processor(s) 904, may serve as a means for collecting information for computing time correction data.

Processor(s) 904, alone or in combination with memory 914, may serve as a means for data processing, such as making determination of timing and positions.

Storage device(s) 910 may serve as a means for data storage, such as a means for storing a whitelist or a blacklist, or a means for storing crowdsourced assistance data for a synchronous network.

Figure 10:
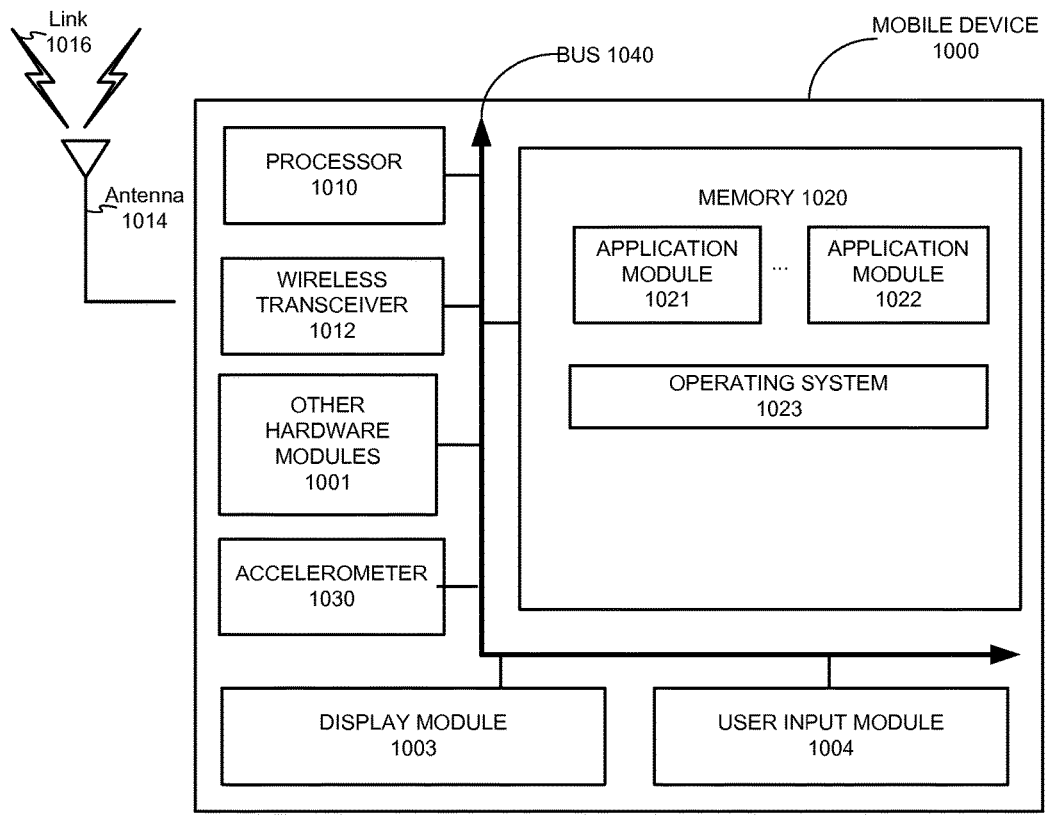
FIG. 10 illustrates an example of a mobile device in which one or more embodiments may be implemented.

FIG. 10 illustrates an example of a mobile device 1000, according to some embodiments. Mobile device 1000 includes a processor 1010, and a memory 1020. Mobile device 1000 may use processor 1010 configured to execute instructions for performing operations at a number of components and can be, for example, a general-purpose processor or microprocessor suitable for implementation within a portable electronic device. Processor 1010 is communicatively coupled with a plurality of components within mobile device 1000. To realize this communicative coupling, processor 1010 may communicate with the other illustrated components across a bus 1040. Bus 1040 can be any subsystem adapted to transfer data within mobile device 1000. Bus 1040 can be a plurality of computer buses and include additional circuitry to transfer data.

Memory 1020 may be coupled to processor 1010. In some embodiments, memory 1020 offers both short-term and long-term storage and may in fact be divided into several units. Memory 1020 may be volatile, such as static random access memory (SRAM) and/or dynamic random access memory (DRAM) and/or non-volatile, such as read-only memory (ROM), flash memory, and the like. Furthermore, memory 1020 can include removable storage devices, such as secure digital (SD) cards. Thus, memory 1020 provides storage of computer readable instructions, data structures, program modules, and other data for mobile device 1000. In some embodiments, memory 1020 may be distributed into different hardware modules.

In some embodiments, memory 1020 stores a plurality of application modules 1021 through 1022, which may be any number of applications. Application modules contain particular instructions to be executed by processor 1010. In alternative embodiments, other hardware modules 1001 may additionally execute certain applications or parts of application modules 1021-1022. In certain embodiments, memory 1020 may additionally include secure memory, which may include additional security controls to prevent copying or other unauthorized access to secure information.

In some embodiments, memory 1020 includes an operating system 1023. Operating system 1023 may be operable to initiate the execution of the instructions provided by application modules 1021-1022 and/or manage other hardware modules 1001 as well as interfaces with communication modules which may use wireless transceiver 1012. Operating system 1023 may be adapted to perform other operations across the components of mobile device 1000 including threading, resource management, data storage control and other similar functionality.

In some embodiments, mobile device 1000 includes a plurality of other hardware modules 1001. Each of other hardware modules 1001 is a physical module within mobile device 1000. However, while each of hardware modules 1001 is permanently configured as a structure, a respective one of hardware modules 1001 may be temporarily configured to perform specific functions or temporarily activated. A common example is an application module that may program a camera module (i.e., hardware module) for shutter release and image capture. A respective one of hardware modules 1001 can be, for example, an accelerometer 1030, a Wi-Fi transceiver, a satellite navigation system receiver (for example, a GPS module), a pressure module, a temperature module, an audio output and/or input module (for example, a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (for example, a module the combines an accelerometer and a gyroscope), an ambient light sensor, a relative humidity sensor, or any other similar module operable to provide sensory output and/or receive sensory input. In some embodiments, one or more functions of the hardware modules 1001-1002 may be implemented in software.

Mobile device 1000 may include a component such as wireless communication module which may integrate antenna 1014 and wireless transceiver 1012 with any other hardware, firmware, or software necessary for wireless communications. Such a wireless communication module may be configured to receive signals from various devices such data sources via networks, access points, base stations, satellite vehicles, and the like, such as base stations 104-108.

In addition to other hardware modules 1001 and application modules 1021-1022, mobile device 1000 may have a display module 1003 and a user input module 1004. Display module 1003 graphically presents information from mobile device 1000 to the user. This information may be derived from one or more application modules 1021, one or more hardware modules 1001, a combination thereof, or any other suitable means for resolving graphical content for the user (for example, by operating system 1023). Display module 1003 can be liquid crystal display (LCD) technology, light emitting polymer display (LPD) technology, or some other display technology. In some embodiments, display module 1003 is a capacitive or resistive touch screen and may be sensitive to haptic and/or tactile contact with a user. In such embodiments, the display module 1003 can comprise a multi-touch-sensitive display.

Antenna 1014 and wireless transceiver 1012 may serve as a means for communications, such as a means for receiving a standards-based communication from the network, a means for receiving reference signals, a means for sending indications that a base station is associated with a synchronous network or an asynchronous network to a server, a means for obtaining a synchronization status of a network associated with one or more base stations, or a means for receiving the synchronization status of the network from a server.

Antenna 1014 and wireless transceiver 1012, in combination with processor 1010 and memory 1020, may serves as a means for determining a synchronization status of a network by a mobile device, such as a means for using system information including an indication of the synchronization status of the network from one or more base stations, a means for using a time difference of arrival (TDOA) between two or more reference signals over a reference period of time, a means for using a difference between two or more clock biases, or a means for determining whether a base station associated with the network is a femtocell.

Processor 1010, alone or in combination with memory 1020, or other components of mobile device 1000, such as accelerometer 1030, a clock source, or a GPS receiver, may serve as a means for various data processing, such as a means for determining the synchronization status of a network, a means for determining whether the system information includes an indication of a synchronization status, a means for determining a position of a mobile device using previously collected crowdsourced assistance data for the synchronous network, a means for determining whether a mobile device is sufficiently stationary for a reference period of time, a means for determining whether a time difference of arrival (TDOA) between a first reference signal and a second reference signal is sufficiently constant over a reference period of time, a means for determining whether a network is a synchronous network, a means for determining clock biases, a means for determining whether a difference between two clock biases exceeds a threshold value, a means for determining a GPS location of the mobile device, a means for determining an acceleration signal produced by an accelerometer of the mobile device, a means for determining whether the mobile device is in a charging state, a means for determining a time of a day, a means for performing an evaluation of a Doppler offset.

Memory 1020 or other storage devices described above, alone or in combination with processor 1010, may serve as a means for data storage, such as a means for storing an indication that the base station is associated with a synchronous network, a means for adding the base station to a whitelist or a blacklist, or a means for storing the whitelist and blacklist.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof.

When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for determining a position of a mobile device connected to a network, the method comprising:
    obtaining, by the mobile device, a synchronization status of the network associated with one or more base stations; and
    in response to the synchronization status indicating that the network is synchronous, determining, by the mobile device, the position of the mobile device using previously collected crowdsourced time correction data for the network, wherein the time correction data includes at least one of a time difference between an actual time of transmission of a signal and an indicated time of transmission of the signal or a time difference between an actual time of reception of a signal and an indicated time of reception of the signal.

2. The method of claim 1, wherein obtaining the synchronization status of the network includes at least one of:
    receiving the synchronization status of the network from a server; or
    determining the synchronization status of the network by the mobile device.

3. The method of claim 2, wherein receiving the synchronization status of the network from the server includes at least one of:
    receiving a whitelist identifying one or more synchronous networks, or one or more base stations associated with synchronous networks; or
    receiving a blacklist identifying one or more asynchronous networks, or one or more base stations associated with asynchronous networks.

4. The method of claim 2, wherein determining the synchronization status of the network by the mobile device includes at least one of:
    using system information including an indication of the synchronization status of the network from the one or more base stations;
    using a time difference of arrival (TDOA) between two or more reference signals over a reference period of time;
    using a difference between two or more clock biases; or
    determining whether a base station associated with the network is a femtocell.

5. The method of claim 4, further comprising:
    sending the synchronization status of the network to a server that stores at least one of:
    a whitelist identifying one or more synchronous networks, or one or more base stations associated with synchronous networks; or
    a blacklist identifying one or more asynchronous networks, or one or more base stations associated with asynchronous networks.

6. The method of claim 4, wherein the system information is included in a standards-based communication from the one or more base stations.

7. The method of claim 6, wherein the standards-based communication is a long-term evolution (LTE) protocol-compliant communication or a code division multiple access (CDMA) protocol-compliant communication.

8. The method of claim 4, wherein the system information includes at least one of a system information block (SIB), an indication of a positioning reference signal (PRS), fine time assistance (FTA) data of a time assistance LTE positioning protocol (LPP) message, or observed time difference of arrival (OTDOA) assistance data including an indication of a slot number offset and an indication of a positioning reference signal subframe offset.

9. The method of claim 4, wherein determining the synchronization status of the network using a time difference of arrival (TDOA) between two or more reference signals over the reference period of time includes:
  receiving a first reference signal from a first signal source associated with the network;
  receiving a second reference signal from a second signal source;
  determining whether the mobile device is sufficiently stationary for a reference period of time;
  determining whether the time difference of arrival (TDOA) between the first reference signal and the second reference signal is sufficiently constant over the reference period of time; and
  based on a determination that the mobile device is sufficiently stationary for the reference period of time and a determination that the TDOA is sufficiently constant over the reference period of time, determining that the network is a synchronous network.

10. The method of claim 9, wherein the first signal source is a first base station associated with the network and the second signal source is a second base station associated with the network.

11. The method of claim 9, wherein the first reference signal is at least one of a positioning reference signal (PRS), a cell-specific reference signal (CRS), a primary synchronization signal (PSS), a secondary synchronization signal (SSS), or a pilot signal of a trilateration system.

12. The method of claim 9, wherein the second reference signal is a reference signal from at least one of a global navigation satellite system, an IEEE 1588 source, another known transmitted reference signal, or any combination thereof.

13. The method of claim 9, wherein determining whether the mobile device is sufficiently stationary for the reference period of time includes determining whether a location of the mobile device varies by less than a threshold amount.

14. The method of claim 9, wherein determining whether the mobile device is sufficiently stationary for the reference period of time includes at least one of:
  determining a GPS location of the mobile device;
  determining an acceleration signal produced by an accelerometer of the mobile device;
  determining whether the mobile device is in a charging state;
  determining a time of a day; or
  performing an evaluation of a Doppler offset.

15. The method of claim 9, wherein determining whether the TDOA between the first reference signal and the second reference signal is sufficiently constant over the reference period of time includes determining whether the TDOA varies by less than a threshold value.

16. The method of claim 4, wherein determining the synchronization status of the network using the difference between two or more clock biases includes:
  determining a first clock bias of a base station associated with the network, the first clock bias being determined at a first time;
  determining a second clock bias of the base station, the second clock bias being determined at a second time;
  determining whether a difference between the first clock bias and the second clock bias exceeds a threshold value; and
  based on a determination that the difference between the first clock bias and the second clock bias does not exceed the threshold value, determining that a network associated with the base station is a synchronous network.

17. The method of claim 16, wherein the first clock bias and the second clock bias are determined with respect to a reference time from a known synchronous system.

18. The method of claim 17, wherein the known synchronous system includes one of a global navigation satellite system, an IEEE 1588 source, a radio access technology that is synchronous, or an oscillator of the mobile device.

19. A mobile device comprising:
  a processor;
  a computer readable storage device coupled to the processor, wherein the computer readable storage device stores one or more programs executable by the processor, the one or more programs including instructions for:
    obtaining, by the mobile device, a synchronization status of a network associated with one or more base stations; and
    in response to the synchronization status indicating that the network is synchronous, determining, by the mobile device, a position of the mobile device using previously collected crowdsourced time correction data for the network, wherein the time correction data includes at least one of a time difference between an actual time of transmission of a signal and an indicated time of transmission of the signal or a time difference between an actual time of reception of a signal and an indicated time of reception of the signal.

20. The mobile device of claim 19, wherein the instructions for obtaining the synchronization status of the network include instructions for at least one of:
  receiving the synchronization status of the network from a server; or
  determining the synchronization status of the network by the mobile device.

21. The mobile device of claim 20, wherein the instructions for receiving the synchronization status of the network from the server include instructions for at least one of:
  receiving a whitelist identifying one or more synchronous networks, or one or more base stations associated with synchronous networks; or
  receiving a blacklist identifying one or more asynchronous networks, or one or more base stations associated with asynchronous networks.

22. The mobile device of claim 20, wherein the instructions for determining the synchronization status of the network by the mobile device include instructions for at least one of:
  using system information including an indication of the synchronization status of the network from the one or more base stations;

using a time difference of arrival (TDOA) between two or more reference signals over a reference period of time;
using a difference between two or more clock biases; or
determining whether a base station associated with the network is a femtocell.

23. The mobile device of claim 22, wherein the one or more programs further include instructions for:
sending the synchronization status of the network to a server that stores at least one of:
a whitelist identifying one or more synchronous networks, or one or more base stations associated with synchronous networks; or
a blacklist identifying one or more asynchronous networks, or one or more base stations associated with asynchronous networks.

24. A non-transitory computer readable storage medium including machine-readable instructions stored thereon for determining a position of a mobile device associated with a network that, when executed by one or more processors, cause the one or more processors to:
obtain, by the mobile device, a synchronization status of the network associated with one or more base stations; and
in response to the synchronization status indicating that the network is synchronous, determine, by the mobile device, the position of the mobile device using previously collected crowdsourced time correction data for the network, wherein the time correction data includes at least one of a time difference between an actual time of transmission of a signal and an indicated time of transmission of the signal or a time difference between an actual time of reception of a signal and an indicated time of reception of the signal.

25. The non-transitory computer readable storage medium of claim 24, wherein the instructions for the one or more processors to obtain the synchronization status of the network include instructions for the one or more processors to at least one of:
receive the synchronization status of the network from a server; or
determine the synchronization status of the network by the mobile device.

26. The non-transitory computer readable storage medium of claim 25, wherein the instructions for the one or more processors to determine the synchronization status of the network by the mobile device include instructions for the one or more processors to at least one of:
use system information including an indication of the synchronization status of the network from the one or more base stations;
use a time difference of arrival (TDOA) between two or more reference signals over a reference period of time;
use a difference between two or more clock biases; or
determine whether a base station associated with the network is a femtocell.

27. The non-transitory computer readable storage medium of claim 26, further comprising instructions for the one or more processors to:
send the synchronization status of the network to a server that stores at least one of:
a whitelist identifying one or more synchronous networks, or one or more base stations associated with synchronous networks; or
a blacklist identifying one or more asynchronous networks, or one or more base stations associated with asynchronous networks.

28. An apparatus comprising:
means for obtaining a synchronization status of a network associated with one or more base stations; and
means for, in response to the synchronization status indicating that the network is synchronous, determining a position of the apparatus using previously collected crowdsourced time correction data for the network, wherein the time correction data includes at least one of a time difference between an actual time of transmission of a signal and an indicated time of transmission of the signal or a time difference between an actual time of reception of a signal and an indicated time of reception of the signal.

29. The apparatus of claim 28, wherein the means for obtaining the synchronization status of the network includes at least one of:
means for receiving the synchronization status of the network from a server; or
means for determining the synchronization status of the network by the apparatus.

30. The apparatus of claim 28, wherein the means for determining the synchronization status of the network by the apparatus includes at least one of:
means for using system information including an indication of the synchronization status of the network from the one or more base stations;
means for using a time difference of arrival (TDOA) between two or more reference signals over a reference period of time;
means for using a difference between two or more clock biases; or
means for determining whether a base station associated with the network is a femtocell.

* * * * *